(12) United States Patent
Hsieh et al.

(10) Patent No.: US 8,385,008 B2
(45) Date of Patent: Feb. 26, 2013

(54) OPTICAL LENS SYSTEM WITH A WIDE FIELD OF VIEW

(75) Inventors: Dung-Yi Hsieh, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 86 days.

(21) Appl. No.: 13/159,990

(22) Filed: Jun. 14, 2011

(65) Prior Publication Data
US 2012/0212836 A1    Aug. 23, 2012

(30) Foreign Application Priority Data
Feb. 18, 2011  (TW) .................. 100105344

(51) Int. Cl.
*G02B 9/64* (2006.01)
*G02B 13/04* (2006.01)

(52) U.S. Cl. ........................ 359/755; 359/751
(58) Field of Classification Search .............. 359/751, 359/755
See application file for complete search history.

(56) References Cited

U.S. PATENT DOCUMENTS
7,446,955 B1  11/2008  Noda
2010/0265596 A1*  10/2010  Su et al. ............... 359/717

* cited by examiner

*Primary Examiner* — William Choi

(57) ABSTRACT

An optical lens system with a wide field of view comprises, in order from the object side to the image side: a first lens element with negative refractive power having a convex object-side surface and a concave image-side surface; a second lens element; a third lens element; a fourth lens element having a concave object-side surface and a convex image-side surface; a fifth lens element with positive refractive power; a sixth lens element with negative refractive power; a seventh lens element, one of an object-side surface and an image-side surface being aspheric. There are seven lens elements with refractive power. By adjusting the arrangement of curvature, refractive power of the respective lens elements and a stop, sufficient field of view can be obtained and the aberrations of the system can be corrected in order to obtain good image quality.

25 Claims, 10 Drawing Sheets

OPTICAL LENS SYSTEM WITH A WIDE FIELD OF VIEW

BACKGROUND OF THE INVENTION

1. Field of the Invention

The present invention relates to an optical lens system with a wide field of view, and more particularly to a miniaturized optical lens system with a larger field of view.

2. Description of the Prior Art

In recent years, the optical lens system has been widely applied in different industries, especially in the industries of the mobile phone cameras, network cameras, automotive lenses, image monitoring, entertainment electronics and so on, and the electronic sensor of a general digital camera is typically a CCD (Charge Coupled Device) or CMOS (Complementary Metal Oxide Semiconductor) sensor. Due to advances in semiconductor manufacturing, the pixel size of sensor has been reduced continuously, and miniaturized optical lens systems have increasingly higher resolution. Therefore, there's an increasing demand for an imaging lens system with better image quality.

Lens systems used in vehicles, image monitoring and electronic entertainment devices usually need a larger field of view since they need to capture a wider range of images at a time. The conventional lens systems with a larger field of view mostly consist of a front lens group with negative refractive power and a rear lens group with positive refractive power, forming a so-called Inverse Telephoto structure, which can provide a wide field of view, such as the optical lens system described in U.S. Pat. No. 7,446,955. Although the Inverse Telephoto structure can obtain a wide field of view, it is difficult to correct aberrations of the system due to the fact that the rear lens group only consists of one lens element. Moreover, in recent years, with the popularity of the vehicle rear view system, the wide field of view optical lens system with a high resolution has become a trend in the market. Therefore, the present invention is aimed at providing a wide field of view optical lens system which can provide great image quality without make the total track length of the optical lens system too long.

The present invention mitigates and/or obviates the aforementioned disadvantages.

SUMMARY OF THE INVENTION

The primary objective of the present invention is to provide an optical lens system with a wide field of view to correct aberrations of the system and obtain good image quality.

An optical lens system with a wide field of view in accordance with the present invention comprises, in order from the object side to the image side: a first lens element with negative refractive power having a convex object-side surface and a concave image-side surface; a second lens element; a third lens element; a fourth lens element having a concave object-side surface and a convex image-side surface; a fifth lens element with positive refractive power; a sixth lens element with negative refractive power; a seventh lens element, at least one of an object-side and an image-side surfaces of the first lens element being aspheric. In the optical lens system with a wide field of view, there are seven lens elements with refractive power. The radius of curvature of the object-side surface of the sixth lens element is R11, the radius of curvature of the image-side surface of the sixth lens element is R12, the focal length of the optical lens system with a wide field of view is f, the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, and the focal length of the seventh lens element is P. The optical lens system is further provided with a stop, the distance from the stop to an image plane along the optical axis is SL, the distance from the object-side surface of the first lens element to the image plane along the optical axis is TTL, and they satisfy the relations: $-0.7<(R11+R12)/(R11-R12)<0.7$; $SUM|pow|<2.5$, wherein $SUM|pow|=|f/f1|+|f/f2|+|f/f3|+|f/f4|+|f/f5|+|f/f6|+|f/f7|$; $0.15<SL/TTL<0.40$. Such arrangements can obtain sufficient field of view, correct aberrations of the system and obtain good image quality.

The first lens element with negative refractive power has a convex object-side surface and a concave image-side surface, which is favorable to enlarge the field of view of the optical lens system, improve the refraction of incident light, prevent the excessive increase of aberrations, and obtain good balance between the field of view and the aberrations of the system.

The fourth lens element has a concave object-side surface and a convex image-side surface, which is favorable to correct the astigmatism of the system.

The fifth lens element with positive refractive power can provide partial refractive power for the optical lens system, and reduce the total track length of the optical lens system.

The sixth lens element with negative refractive power can effectively correct aberrations of the optical lens system.

If $(R11+R12)/(R11-R12)$ satisfies the relation: $-0.7<(R11+R12)/(R11-R12)<0.7$, the curvatures of the object-side and image-side surfaces of the sixth lens element are appropriate for the arrangement of the fifth and seventh lens elements, so that the total track length of the optical lens system will not be too long.

If $SUM|pow|$ satisfies the relation: $SUM|pow|<2.5$, the refractive power of the respective lens elements and the optical lens system will be appropriate, which can prevent the excessive generations of aberrations when the refractive power of any of the lens elements is excessively large. Preferably, $SUM|pow|$ satisfies the relation: $SUM|pow|<2.0$.

If SL/TTL satisfies the relation: $0.15<SL/TTL<0.40$, the stop can be located at a favorable position for wide field of view and for better correction of the distortion and the chromatic aberration of magnification.

According to one aspect of the present optical lens system with a wide field of view, the second lens element with negative refractive power can function favorably with the first lens element to enlarge the field of view and correct aberrations of the optical lens system. The third lens element with positive refractive power can reduce the sensitivity of the optical lens system. The seventh lens element with positive refractive power can further reduce the total track length of the optical lens system, so as to maintain the objective of miniaturization of the optical lens system.

According to another aspect of the present optical lens system, if the second lens element has a convex object-side surface and a concave image-side surface, it can function favorably with the first lens element with negative refractive power having a convex object-side surface and a concave image-side surface to enlarge the field of view. If the second lens element has a concave object-side surface and a convex image-side surface, it will be favorable to correct aberrations of the optical lens system. If the third lens element has a concave object-side surface and a convex image-side surface, it will be favorable to correct astigmatism of the system. If the fifth lens element has a convex object-side surface and a concave image-side surface, it will be favorable to enhance the positive refractive power of the fifth lens element and reduce the total track length of the optical lens system. If the sixth lens element has a concave object-side surface and a concave image-side surface, it can effectively correct aberrations of the optical lens system. If the seventh lens element has a convex object-side surface, it will be favorable to correct the high order aberrations of the system.

According to another aspect of the present optical lens system, the focal length of the optical lens system with a wide field of view is f, the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, and the focal length of the seventh lens element is f7, and they satisfy the relations: P5=|f/f5|, P6=|f/f6|, P7=|f/f7|, SUM|pow|=|f/f1|+|f/f2|+|f/f3|+|f/f4|+|f/f5|+|f/f6|+|f/f7|. If (P5+P6+P7)/(SUM|pow|) satisfies the relation: 0.5<(P5+P6+P7)/(SUM|pow|)<1.0, the distribution of the refractive power of the last three lens elements (the fifth, sixth and seventh lens elements) will be appropriate, which can effectively correct various aberrations of the optical lens system. Preferably, (P5+P6+P7)/(SUM|pow|) satisfies the relation:

0.65<(P5+P6+P7)/(SUM|pow|)<0.80.

According to another aspect of the present optical lens system, the first lens element is made of glass, and the refractive index of the first lens element is N1. If N1 satisfies the relation: N1>1.70, the material of the first lens element will be appropriate, which can prevent the generation of excessive aberrations in case of a wide field of view.

According to another aspect of the present optical lens system, the focal length of the optical lens system with a wide field of view is f, and a distance on an optical axis between the fourth lens element and the fifth lens element is T45. If T45/f satisfies the relation: 2.0<T45/f<3.5, there will be enough space between the fourth lens element and the fifth lens element to allow the fourth lens element to be adjusted to an optimal position within the system.

According to another aspect of the present optical lens system, the focal length of the optical lens system with a wide field of view is f, and the focal length of the fourth lens element is f4. If |f/f4| satisfies the relation: |f/f4|<0.2, the refractive power of the fourth lens elements can effectively correct aberrations of the optical lens system. Preferably, |f/f4| satisfies the relation: |f/f4|<0.1, the refractive power of the fourth lens elements will be appropriate, which can effectively correct aberrations of the optical lens system.

According to another aspect of the present optical lens system, the distance between the object-side surface of the fifth lens element and the image-side surface of the seventh lens element is Dr9r14, and the distance between the object-side surface of the first lens element and the image-side surface of the seventh lens element is Td. If Dr9r14/Td satisfies the relation: 0.07<Dr9r14/Td<0.25, the rear lens group (from the fifth lens element to the seventh lens element) has a better configuration, which can effectively reduce the total track length of the optical lens system. Preferably, Dr9r14/Td satisfies the relation: 0.12<Dr9r14/Td<0.18.

According to another aspect of the present optical lens system, the Abbe number of the sixth lens element is V6, and the Abbe number of the seventh lens element is V7. If V7−V6 satisfies the relation: 28.0<V7−V6<40.0, it can allow better correction of the chromatic aberration of the optical lens system.

According to another aspect of the present optical lens system, the distance between the object-side surface of the first lens element and the object-side surface of the third lens element is Dr1r5, and the distance between the object-side surface of the first lens element and the image-side surface of the seventh lens element is Td. If Dr1r5/Td satisfies the relation: 0.5<Dr1r5/Td<0.8, the first lens element and the second lens element can effectively moderate aberrations of the optical lens system.

According to another aspect of the present optical lens system, the focal length of the optical lens system with a wide field of view is f, and the focal length of the first lens element is f4. If f/f1 satisfies the relation: −0.3<f/f1<−0.1, the refractive power of the first lens element will be appropriate, which can effectively enhance the feature of wide field of view and provide a larger field of view.

According to another aspect of the present optical lens system, the radius of curvature of the object-side surface of the fourth lens element is R7, and the radius of curvature of the image-side surface of the fourth lens element is R8. If |(R7+R8)/(R7−R8)| satisfies the relation: 4.5<|(R7+R8)/(R7−R8)|<9.0, the curvature of the object-side and image-side surfaces of the fourth lens element can effectively correct the astigmatism of the system.

According to another aspect of the present optical lens system, the radius of curvature of the object-side surface of the second lens element is R3, and the radius of curvature of the image-side surface of the second lens element is R4. If R3/R4 satisfies the relation: 0.75<R3/R4<1.2, it can enhance the aberrations correction effect of the second lens element.

According to another aspect of the present optical lens system, the focal length of the optical lens system with a wide field of view is f, and the focal length of the second lens element is f2. If |f/f2| satisfies the relation: |f/f2|<0.2, the second lens element can function with the first lens element to avoid producing too many aberrations while providing a wide field of view.

The present invention will be presented in further details from the following descriptions with the accompanying drawings, which show, for purpose of illustrations only, the preferred embodiments in accordance with the present invention.

DETAILED DESCRIPTION OF THE PREFERRED EMBODIMENTS

Figure 1A:
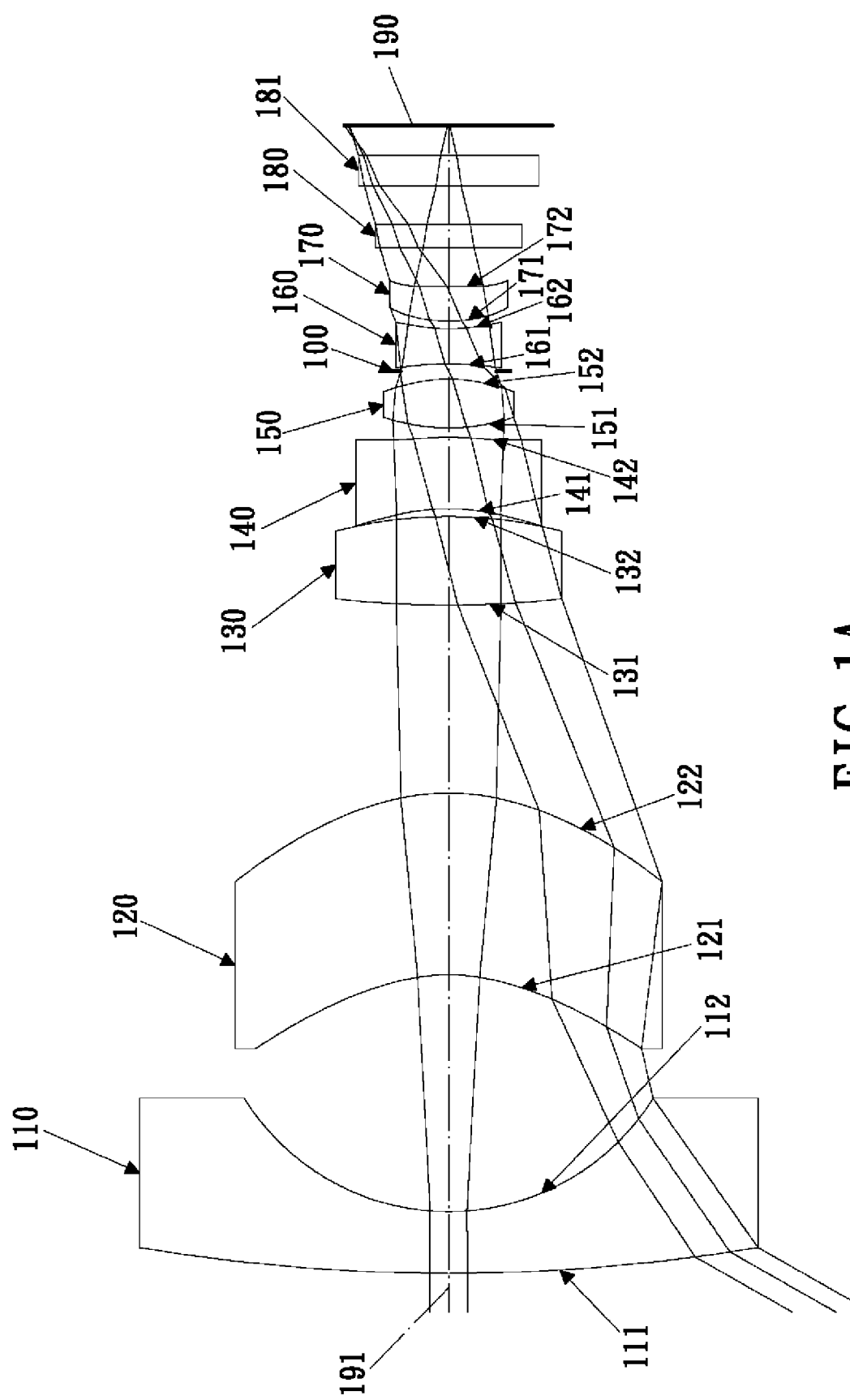
FIG. 1A shows an optical lens system in accordance with a first embodiment of the present invention.
Figure 1B:
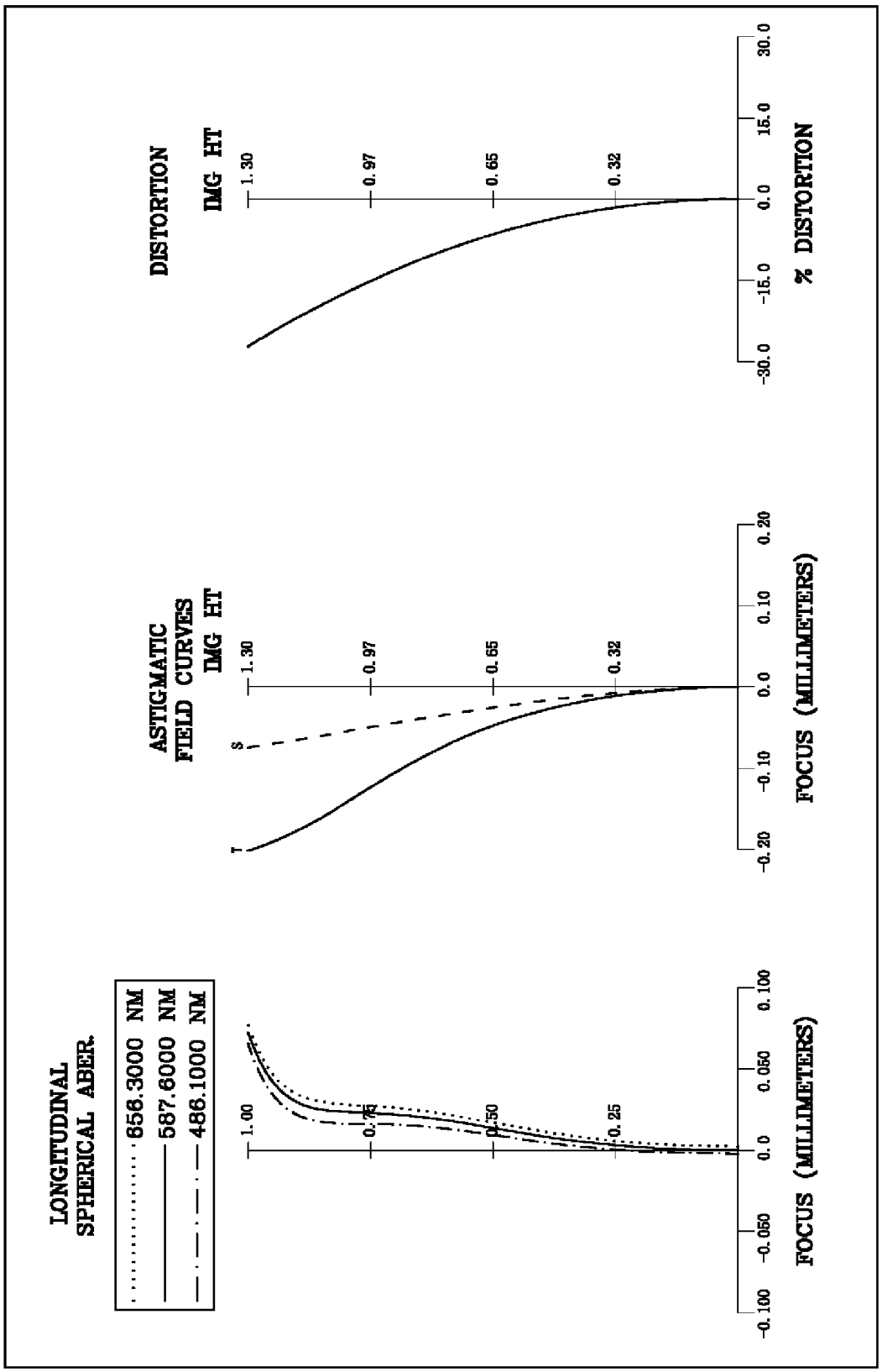
FIG. 1B shows the longitudinal spherical aberration curves, the astigmatic field curves, and the distortion curve of the first embodiment of the present invention.

Referring to FIG. 1A, which shows an optical lens system with a wide field of view in accordance with a first embodiment of the present invention, and FIG. 1B shows the longitudinal spherical aberration curves, the astigmatic field curves, and the distortion curve of the first embodiment of the present invention. An optical lens system with a wide field of view in accordance with the first embodiment of the present invention comprises, in order from the object side to the image side:

A first lens element 110 with negative refractive power made of glass has a convex object-side surface 111 and a concave image-side surface 112.

A second lens element 120 with positive refractive power made of plastic has a concave object-side surface 121 and a convex image-side surface 122, and the object-side surface 121 and the image-side surface 122 of the second lens element 120 are aspheric.

A third lens element 130 with positive refractive power made of glass has a convex object-side surface 131 and a convex image-side surface 132.

A fourth lens element 140 with negative refractive power made of plastic has a concave object-side surface 141 and a convex image-side surface 142, and the object-side surface 141 and the image-side surface 142 of the fourth lens element 140 are aspheric.

A fifth lens element 150 with positive refractive power made of plastic has a convex object-side surface 151 and a convex image-side surface 152, and the object-side surface 151 and the image-side surface 152 of the fifth lens element 150 are aspheric.

A sixth lens element 160 with negative refractive power made of plastic has a concave object-side surface 161 and a concave image-side surface 162, and the object-side surface 161 and the image-side surface 162 of the sixth lens element 160 are aspheric.

A seventh lens element 170 with positive refractive power made of plastic has a convex object-side surface 171 and a convex image-side surface 172, and the object-side surface 171 and the image-side surface 172 of the seventh lens element 170 are aspheric.

A stop 100 is located between the fifth lens element 150 and the sixth lens element 160.

An IR cut filter 180 made of glass is located between the image-side surface 172 of the seventh lens element 170 and an image plane 190 and has no influence on the focal length of the optical lens system.

A cover glass 181 made of glass is located between the IR cut filter 180 and the image plane 190 to protect a sensor (not shown), and has no influence on the focal length of the optical lens system.

In the first embodiment of the present optical lens system, the focal length of the optical lens system with a wide field of view is f, and it satisfies the relation:

$f=1.04.$

In the first embodiment of the present optical lens system, the f-number of the optical lens system with a wide field of view is Fno, and it satisfies the relation:

$Fno=2.08.$

In the first embodiment of the present optical lens system, half of the maximal field of view is HFOV, and it satisfies the relation:

$HFOV=60.4.$

In the first embodiment of the present optical lens system, the Abbe number of the seventh lens element 170 is V7, the Abbe number of the sixth lens element 160 is V6, and they satisfy the relation:

$|V7-V6|=32.90.$

In the first embodiment of the present optical lens system, the radius of curvature of the object-side surface 121 of the second lens element 120 is R3, the radius of curvature of the image-side surface 122 of the second lens element 120 is R4, and they satisfy the relation:

$R3/R4=0.85.$

In the first embodiment of the present optical lens system, the radius of curvature of the object-side surface 141 of the fourth lens element 140 is R7, the radius of curvature of the image-side surface 142 of the fourth lens element 140 is R8, and they satisfy the relation:

$|(R7+R8)/(R7-R8)|=5.42.$

In the first embodiment of the present optical lens system, the radius of curvature of the object-side surface 161 of the sixth lens element 160 is R11, the radius of curvature of the image-side surface 162 of the sixth lens element 160 is R12, and they satisfy the relation:

$(R11+R12)/(R11-R12)=0.34.$

In the first embodiment of the present optical lens system, the focal length of the optical lens system with a wide field of view is f, the distance on the optical axis between the fourth lens element 140 and the fifth lens element 150 is T45, and they satisfy the relation:

$T45/f=0.12.$

In the first embodiment of the present optical lens system, the focal length of the optical lens system with a wide field of view is f, the focal length of the first lens element 110 is f1, and they satisfy the relation:

$f/f1=-0.23.$

In the first embodiment of the present optical lens system, the focal length of the optical lens system with a wide field of view is f, the focal length of the second lens element 120 is f2, and they satisfy the relation:

$|f/f2|=0.04.$

In the first embodiment of the present optical lens system, the focal length of the optical lens system with a wide field of view is f, the focal length of the fourth lens element 140 is f4, and they satisfy the relation:

$|f/f4|=0.04.$

In the first embodiment of the present optical lens system, the distance between the object-side surface 111 of the first lens element 110 and the object-side surface 131 of the third lens element 130 is Dr1r5, the distance between the object-side surface 111 of the first lens element 110 and the image-side surface 172 of the seventh lens element 170 is Td, and they satisfy the relation:

$Dr1r5/Td=0.68.$

In the first embodiment of the present optical lens system, the distance between the object-side surface 151 of the fifth lens element 150 and the image-side surface 172 of the seventh lens element 170 is Dr9r14, and the distance between the object-side surface 111 of the first lens element 110 and the image-side surface 172 of the seventh lens element 170 is Td, and they satisfy the relation:

$$Dr9r14/Td=0.14.$$

In the first embodiment of the present optical lens system, the focal length of the optical lens system with a wide field of view is f, the focal length of the first lens element 110 is f1, the focal length of the second lens element 120 is f2, the focal length of the third lens element 130 is f3, the focal length of the fourth lens element 140 is f4, the focal length of the fifth lens element 150 is f5, the focal length of the sixth lens element 160 is f6, the focal length of the seventh lens element 170 is f7, SUM|pow|=|f/f1|+|f/f2|+|f/f3|+|f/f4|+|f/f5|+|f/f6|+|f/f7|, and they satisfy the relation:

$$SUM|pow|=1.73.$$

In the first embodiment of the present optical lens system, the focal length of the optical lens system with a wide field of view is f, the focal length of the first lens element 110 is f1, the focal length of the second lens element 120 is f2, the focal length of the third lens element 130 is f3, the focal length of the fourth lens element 140 is f4, the focal length of the fifth lens element 150 is f5, the focal length of the sixth lens element 160 is f6, the focal length of the seventh lens element 170 is f7, P5=|f/f5|, P6=|f/f6|, P7=|f/f7|, SUM|pow|=|f/f1|+|f/f2|+|f/f3|+|f/f4|+|f/f5|+|f/f6|+|f/f7|, and they satisfy the relation:

$$(P5+P6+P7)/(SUM|pow|)=0.74.$$

In the first embodiment of the present optical lens system, the distance from the stop 100 to the image plane 190 along the optical axis 191 is SL, the distance from the object-side surface 111 of the first lens element 110 to the image plane 190 along the optical axis 191 is TTL, and they satisfy the relation:

$$SL/TTL=0.20.$$

The detailed optical data of the first embodiment is shown in table 1, and the aspheric surface data is shown in table 2, wherein the units of the radius of curvature, the thickness and the focal length are expressed in mm.

TABLE 1

(Embodiment 1)
f(focal length) = 1.04 mm, Fno = 2.08, HFOV (half of field of view) = 60.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 23.9554 | 0.800 | Glass | 1.804 | 46.5 | −4.54 |
| 2 | | 3.1191 | 3.068 | | | | |
| 3 | Lens 2 | −2.49791 (ASP) | 2.355 | Plastic | 1.633 | 23.4 | 25.62 |
| 4 | | −2.95528 (ASP) | 2.432 | | | | |
| 5 | Lens 3 | 12.9244 | 1.150 | Glass | 1.517 | 64.2 | 7.86 |
| 6 | | −5.7404 | 0.100 | | | | |
| 7 | Lens 4 | −2.91828 (ASP) | 0.927 | Plastic | 1.535 | 56.3 | −23.22 |
| 8 | | −4.23760 (ASP) | 0.122 | | | | |
| 9 | Lens 5 | 3.36830 (ASP) | 0.631 | Plastic | 1.535 | 56.3 | 2.33 |
| 10 | | −1.85125 (ASP) | 0.100 | | | | |
| 11 | Stop | Plano | 0.100 | | | | |
| 12 | Lens 6 | −4.07630 (ASP) | 0.450 | Plastic | 1.633 | 23.4 | −2.07 |
| 13 | | 2.01899 (ASP) | 0.102 | | | | |
| 14 | Lens 7 | 2.16367 (ASP) | 0.450 | Plastic | 1.535 | 56.3 | 3.07 |
| 15 | | −6.27750 (ASP) | 0.500 | | | | |
| 16 | IR-filter | Plano | 0.300 | Glass | 1.517 | 64.2 | |
| 17 | | Plano | 0.500 | | | | |
| 18 | Cover-glass | Plano | 0.400 | Glass | 1.517 | 64.2 | |
| 19 | | Plano | 0.385 | | | | |
| 20 | Image | Plano | | | | | |

Note:
reference wavelength is: d-line 587.6 nm, and the diameter of the effective aperture of the surface # 8 is 1.883 mm.

TABLE 2

Aspheric Coefficients

| Surface # | 3 | 4 | 7 | 8 | 9 |
|---|---|---|---|---|---|
| k = | −4.05761E+00 | −3.45086E+00 | −2.06355E−01 | −1.68071E+01 | −2.66733E+01 |
| A4 = | −4.61866E−03 | −5.46999E−03 | −2.16687E−02 | 5.59359E−02 | 2.19869E−01 |
| A6 = | 3.80250E−04 | 3.17206E−04 | 4.69580E−02 | 1.00053E−02 | −1.79373E−01 |
| A8 = | −4.51368E−05 | −1.56938E−05 | −1.61291E−02 | 2.25917E−02 | 1.15331E−01 |
| A10 = | 3.14577E−06 | 5.19202E−07 | 1.71009E−03 | −1.89280E−02 | −1.26740E−01 |

| Surface # | 10 | 12 | 13 | 14 | 15 |
|---|---|---|---|---|---|
| k = | −4.31394E+00 | −4.55257E+01 | −8.58818E+00 | −1.41156E+01 | 2.22020E+01 |
| A4 = | 1.11579E−01 | −9.34202E−02 | −1.72997E−01 | 2.65296E−01 | 4.05117E−01 |
| A6 = | −2.59933E−01 | −5.49754E−02 | −1.52281E−02 | −2.57219E−01 | −2.29317E−02 |
| A8 = | 1.93885E−01 | 7.83217E−01 | 1.30678E+00 | 5.44699E−01 | −2.70912E−02 |
| A10 = | −8.96668E−02 | −8.22802E−01 | −1.38068E+00 | −4.69459E−01 | −1.06369E−01 |

Figure 2A:
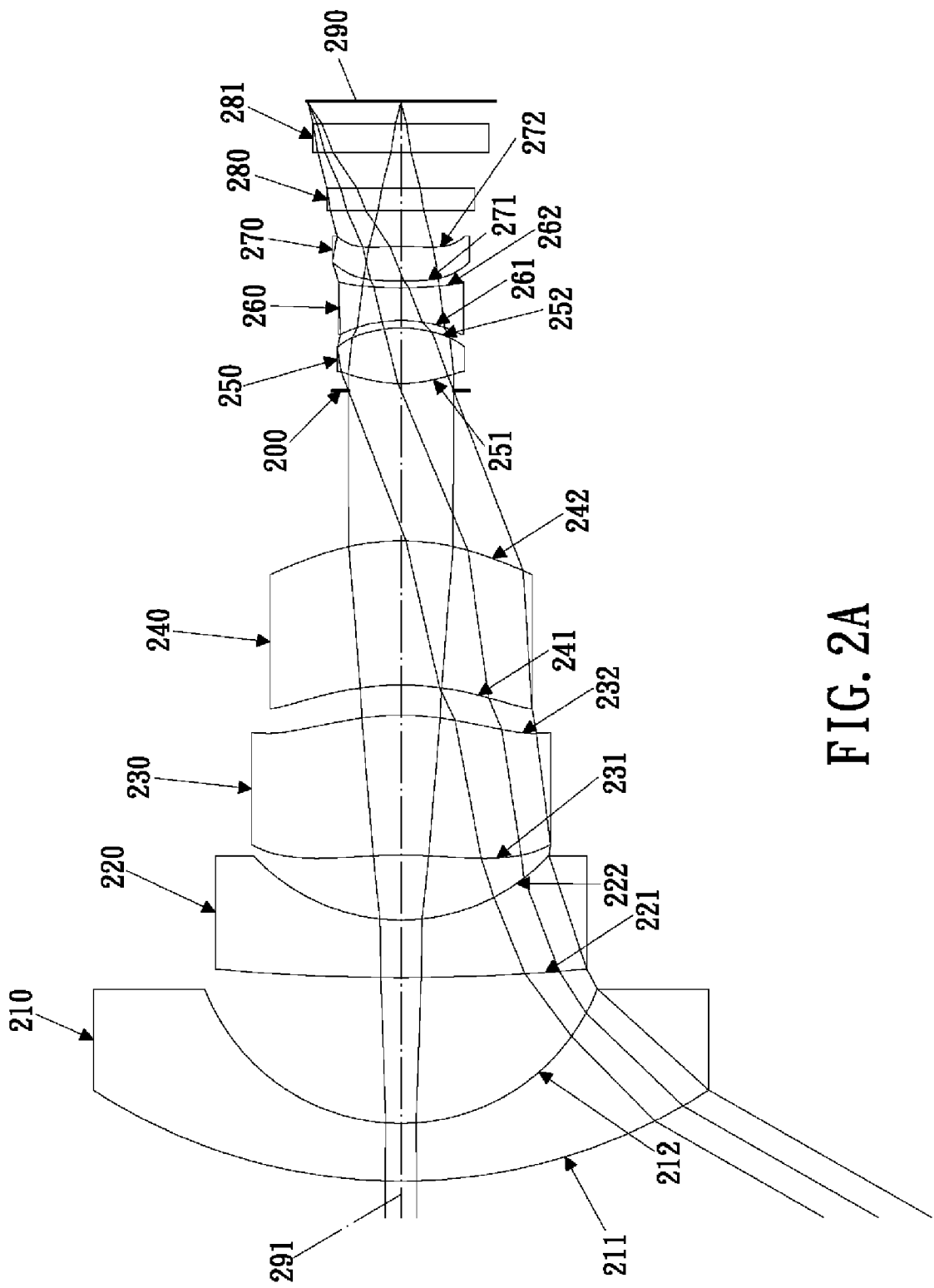
FIG. 2A shows an optical lens system in accordance with a second embodiment of the present invention.
Figure 2B:
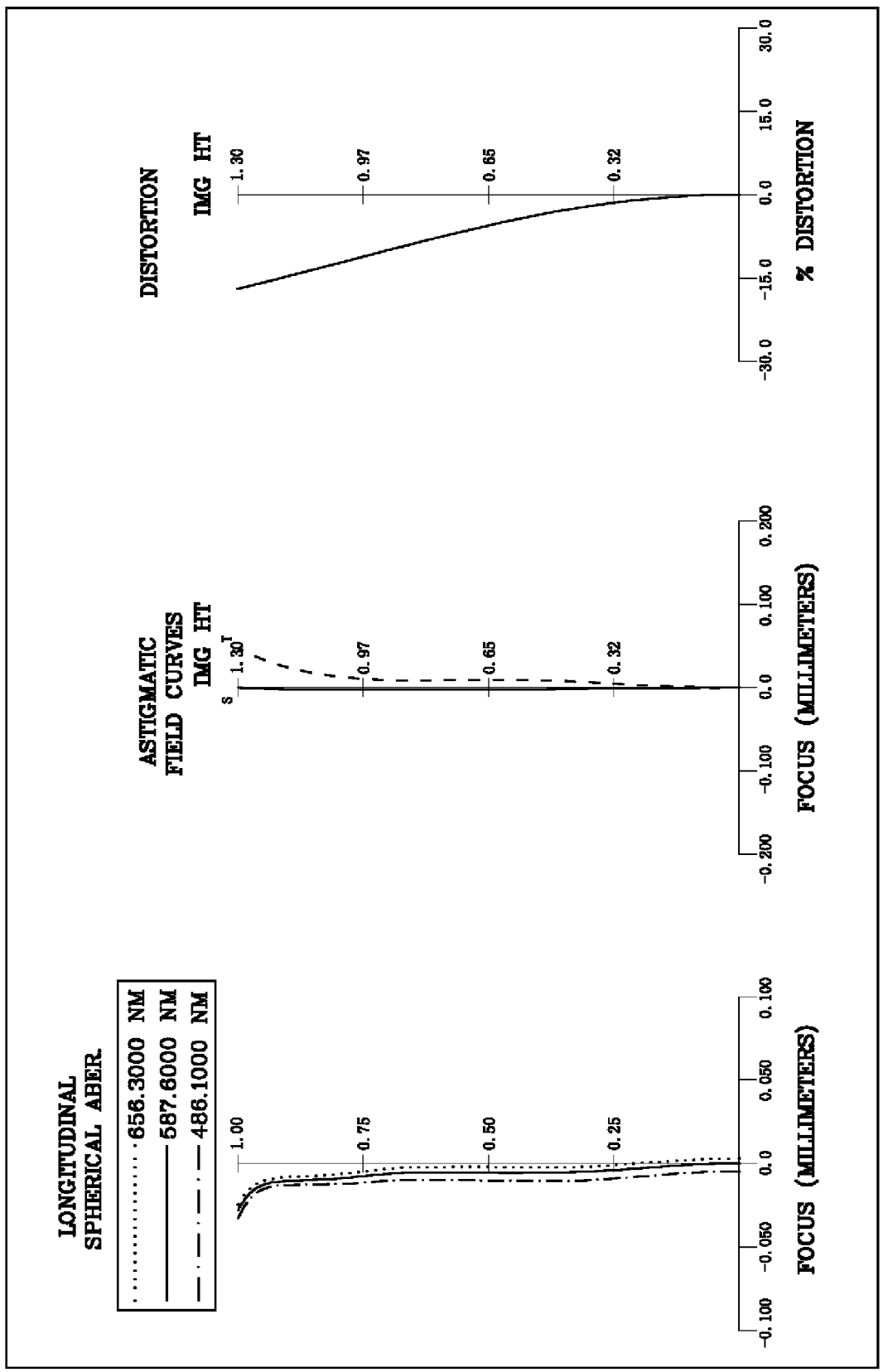
FIG. 2B shows the longitudinal spherical aberration curves, the astigmatic field curves, and the distortion curve of the second embodiment of the present invention.

Referring to FIG. 2A, which shows an optical lens system with a wide field of view in accordance with a second embodiment of the present invention, and FIG. 2B shows the longitudinal spherical aberration curves, the astigmatic field curves, and the distortion curve of the second embodiment of the present invention. The second embodiment of the present invention comprises, in order from the object side to the image side:

A first lens element 210 with negative refractive power made of glass has a convex object-side surface 211 and a concave image-side surface 212.

A second lens element 220 with negative refractive power made of glass has a convex object-side surface 221 and a concave image-side surface 222.

A third lens element 230 with positive refractive power made of plastic has a concave object-side surface 231 and a convex image-side surface 232, and the object-side surface 231 and the image-side surface 232 of the third lens element 230 are aspheric.

A fourth lens element 240 with positive refractive power made of plastic has a concave object-side surface 241 and a convex image-side surface 242, and the object-side surface 241 and the image-side surface 242 of the fourth lens element 240 are aspheric.

A fifth lens element 250 with positive refractive power made of plastic has a convex object-side surface 251 and a convex image-side surface 252, and the object-side surface 251 and the image-side surface 252 of the fifth lens element 250 are aspheric.

A sixth lens element 260 with negative refractive power made of plastic has a concave object-side surface 261 and a concave image-side surface 262, and the object-side surface 261 and the image-side surface 262 of the fourth lens element 260 are aspheric.

A seventh lens element 270 with positive refractive power made of plastic has a convex object-side surface 271 and a convex image-side surface 272, and the object-side surface 271 and the image-side surface 272 of the seventh lens element 270 are aspheric.

A stop 200 is located between the fourth lens element 240 and the fifth lens element 250.

An IR cut filter 280 made of glass is located between the image-side surface 272 of the seventh lens element 270 and an image plane 290 and has no influence on the focal length of the optical lens system.

A cover glass 281 made of glass is located between the IR cut filter 280 and the image plane 290 to protect a sensor (not shown), and has no influence on the focal length of the optical lens system.

In the second embodiment of the present optical lens system, the focal length of the optical lens system with a wide field of view is f, and it satisfies the relation:

$f=0.92$.

In the second embodiment of the present optical lens system, the f-number of the optical lens system with a wide field of view is Fno, and it satisfies the relation:

$Fno=2.05$.

In the second embodiment of the present optical lens system, half of the maximal field of view is HFOV, and it satisfies the relation:

$HFOV=60.3$.

In the second embodiment of the present optical lens system, the Abbe number of the seventh lens element 270 is V7, the Abbe number of the sixth lens element 260 is V6, and they satisfy the relation:

$|V7-V6|=32.50$.

In the second embodiment of the present optical lens system, the radius of curvature of the object-side surface 221 of the second lens element 220 is R3, the radius of curvature of the image-side surface 222 of the second lens element 220 is R4, and they satisfy the relation:

$R3/R4=9.48$.

In the second embodiment of the present optical lens system, the radius of curvature of the object-side surface 241 of the fourth lens element 240 is R7, the radius of curvature of the image-side surface 242 of the fourth lens element 240 is R8, and they satisfy the relation:

$|(R7+R8)/(R7-R8)|=8.45$.

In the second embodiment of the present optical lens system, the radius of curvature of the object-side surface 261 of the sixth lens element 260 is R11, the radius of curvature of the image-side surface 262 of the sixth lens element 260 is R12, and they satisfy the relation:

$(R11+R12)/(R11-R12)=-0.34$.

In the second embodiment of the present optical lens system, the focal length of the optical lens system with a wide field of view is f, the distance on the optical axis between the fourth lens element 240 and the fifth lens element 250 is T45, and they satisfy the relation:

$T45/f=2.37$.

In the second embodiment of the present optical lens system, the focal length of the optical lens system with a wide field of view is f, the focal length of the first lens element 210 is f1, and they satisfy the relation:

$f/f1=-0.15$.

In the second embodiment of the present optical lens system, the focal length of the optical lens system with a wide field of view is f, the focal length of the second lens element 220 is f2, and they satisfy the relation:

$|f/f2|=0.21$.

In the second embodiment of the present optical lens system, the focal length of the optical lens system with a wide field of view is f, the focal length of the fourth lens element 240 is f4, and they satisfy the relation:

$|f/f4|=0.06$.

In the second embodiment of the present optical lens system, the distance between the object-side surface 211 of the first lens element 210 and the object-side surface 231 of the third lens element 230 is Dr1r5, the distance between the object-side surface 211 of the first lens element 210 and the image-side surface 272 of the seventh lens element 270 is Td, and they satisfy the relation:

$Dr1r5/Td=0.35$.

In the second embodiment of the present optical lens system, the distance between the object-side surface 251 of the fifth lens element 250 and the image-side surface 272 of the seventh lens element 270 is Dr9r14, and the distance between the object-side surface 211 of the first lens element 210 and the image-side surface 272 of the seventh lens element 270 is Td, and they satisfy the relation:

$Dr9r14/Td=0.15$.

In the second embodiment of the present optical lens system, the focal length of the optical lens system with a wide field of view is f, the focal length of the first lens element 210 is f1, the focal length of the second lens element 220 is f2, the focal length of the third lens element 230 is f3, the focal length of the fourth lens element 240 is f4, the focal length of the fifth lens element 250 is f5, the focal length of the sixth lens element 260 is f6, the focal length of the seventh lens element 270 is f7, SUM|pow|=|f/f1|+|f/f2|+|f/f3|+|f/f4|+|f/f5|+|f/f6|+|f/f7|, and they satisfy the relation:

SUM|pow|=1.65.

In the second embodiment of the present optical lens system, the focal length of the optical lens system with a wide field of view is f, the focal length of the first lens element 210 is f1, the focal length of the second lens element 220 is f2, the focal length of the third lens element 230 is f3, the focal length of the fourth lens element 240 is f4, the focal length of the fifth lens element 250 is f5, the focal length of the sixth lens element 260 is f6, the focal length of the seventh lens element 270 is f7, P5=|f/f5|, P6=|f/f6|, P7=|f/f7|, SUM|pow|=|f/f1|+|f/f2|+|f/f3|+|f/f4|+|f/f5|+|f/f6|+|f/f7|, and they satisfy the relation:

$(P5+P6+P7)/(SUM|pow|)=0.69$.

In the second embodiment of the present optical lens system, the distance from the stop 200 to the image plane 290 along the optical axis 291 is SL, the distance from the object-side surface 211 of the first lens element 210 to the image plane 290 along the optical axis 291 is TTL, and they satisfy the relation:

$SL/TTL=0.26$.

The detailed optical data of the second embodiment is shown in table 3, and the aspheric surface data is shown in table 4, wherein the units of the radius of curvature, the thickness and the focal length are expressed in mm.

TABLE 3

(Embodiment 2)
f(focal length) = 0.92 mm, Fno = 2.05, HFOV (half of field of view) = 60.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 7.8242 | 0.800 | Glass | 1.804 | 46.5 | −6.23 |
| 2 | | 2.9164 | 2.020 | | | | |
| 3 | Lens 2 | 26.4861 | 0.800 | Glass | 1.729 | 54.5 | −4.34 |
| 4 | | 2.7935 | 0.900 | | | | |
| 5 | Lens 3 | −6.90340 (ASP) | 1.940 | Plastic | 1.632 | 23.4 | 9.52 |
| 6 | | −3.56470 (ASP) | 0.419 | | | | |
| 7 | Lens 4 | −4.03370 (ASP) | 2.000 | Plastic | 1.544 | 55.9 | 15.12 |
| 8 | | −3.17980 (ASP) | 2.079 | | | | |
| 9 | Stop | Plano | 0.100 | | | | |
| 10 | Lens 5 | 2.08950 (ASP) | 0.771 | Plastic | 1.544 | 55.9 | 1.74 |
| 11 | | −1.50586 (ASP) | 0.100 | | | | |
| 12 | Lens 6 | −2.07789 (ASP) | 0.450 | Plastic | 1.632 | 23.4 | −2.14 |
| 13 | | 4.19640 (ASP) | 0.100 | | | | |
| 14 | Lens 7 | 15.24220 (ASP) | 0.479 | Plastic | 1.544 | 55.9 | 5.43 |
| 15 | | −3.62830 (ASP) | 0.500 | | | | |
| 16 | IR-filter | Plano | 0.300 | Glass | 1.517 | 64.2 | |
| 17 | | Plano | 0.500 | | | | |
| 18 | Cover-glass | Plano | 0.400 | Glass | 1.517 | 64.2 | |
| 19 | | Plano | 0.316 | | | | |
| 20 | Image | Plano | | | | | |

Note:
reference wavelength is: d-line 587.6 nm.

TABLE 4

| Aspheric Coefficients | | | | | |
|---|---|---|---|---|---|
| Surface # | 5 | 6 | 7 | 8 | 10 |
| k = | −5.00000E+01 | −1.00864E+01 | 7.50423E−01 | −5.24959E−01 | 9.29473E−02 |
| A4 = | 1.89598E−02 | 2.51495E−04 | 1.69123E−03 | 1.73493E−03 | 1.97014E−02 |
| A6 = | −6.76222E−04 | 3.31961E−03 | 2.71617E−03 | 2.89335E−03 | −4.06788E−02 |
| A8 = | −2.63523E−05 | −1.05598E−03 | −3.00081E−04 | −8.40675E−04 | 1.00646E−01 |
| A10 = | 3.17227E−05 | 1.96781E−04 | 1.06273E−04 | 1.19946E−04 | −2.24553E−01 |
| Surface # | 11 | 12 | 13 | 14 | 15 |
| k = | −1.65332E+00 | −1.53641E+01 | 2.33459E+00 | 4.93451E+01 | −4.34300E+00 |
| A4 = | 1.67417E−01 | −1.93452E−01 | −1.23876E−01 | 3.12734E−01 | 3.28044E−01 |
| A6 = | −2.65303E−01 | 1.11435E−01 | 1.40265E−01 | 5.58464E−03 | 1.37213E−01 |
| A8 = | −3.25895E−02 | −2.21060E−01 | 7.38231E−02 | −6.06858E−02 | −7.51222E−02 |
| A10 = | 4.34582E−02 | 2.13943E−01 | −7.25735E−02 | 2.42413E−02 | 1.09873E−02 |

Figure 3A:
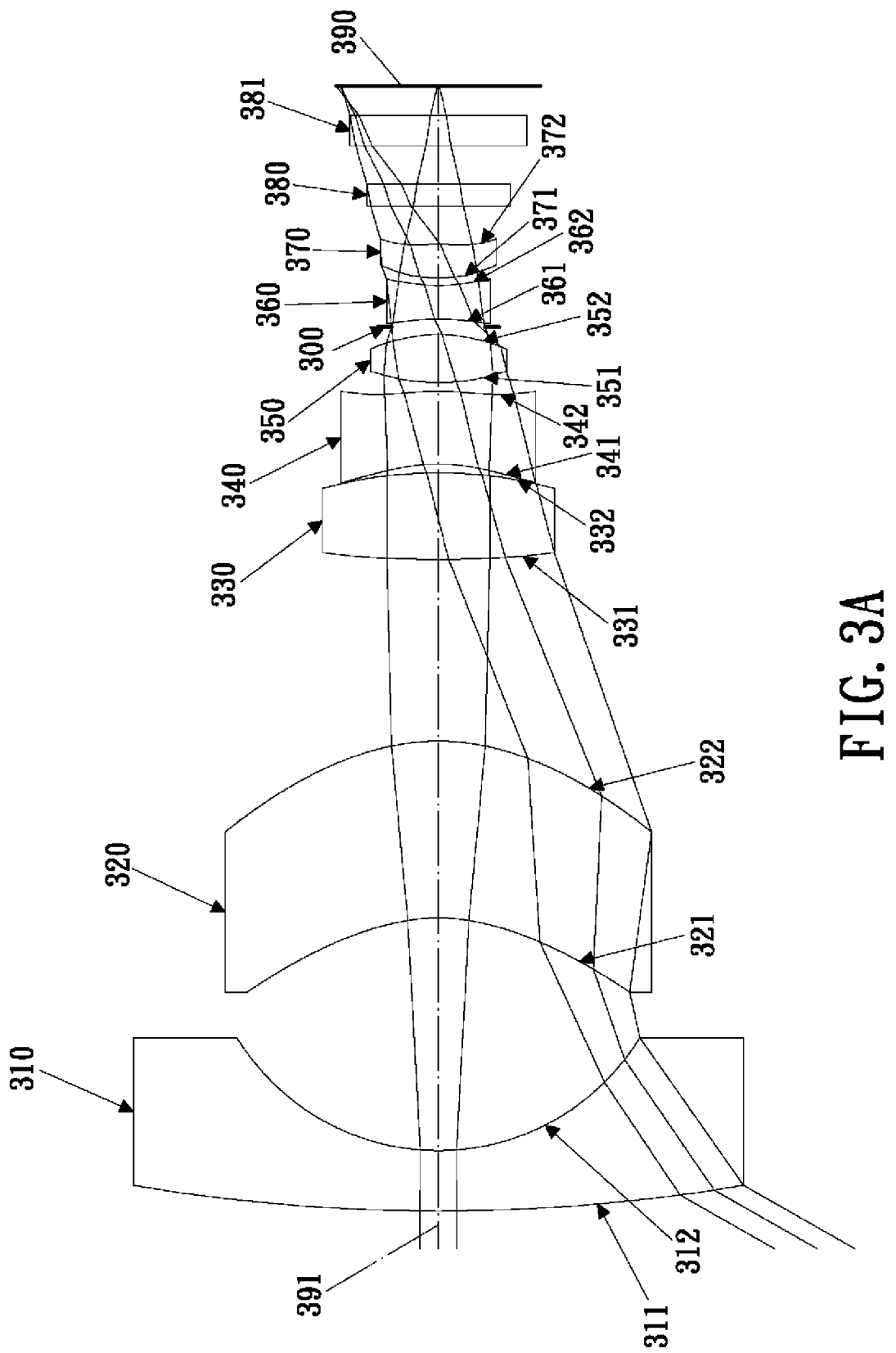
FIG. 3A shows an optical lens system in accordance with a third embodiment of the present invention.
Figure 3B:
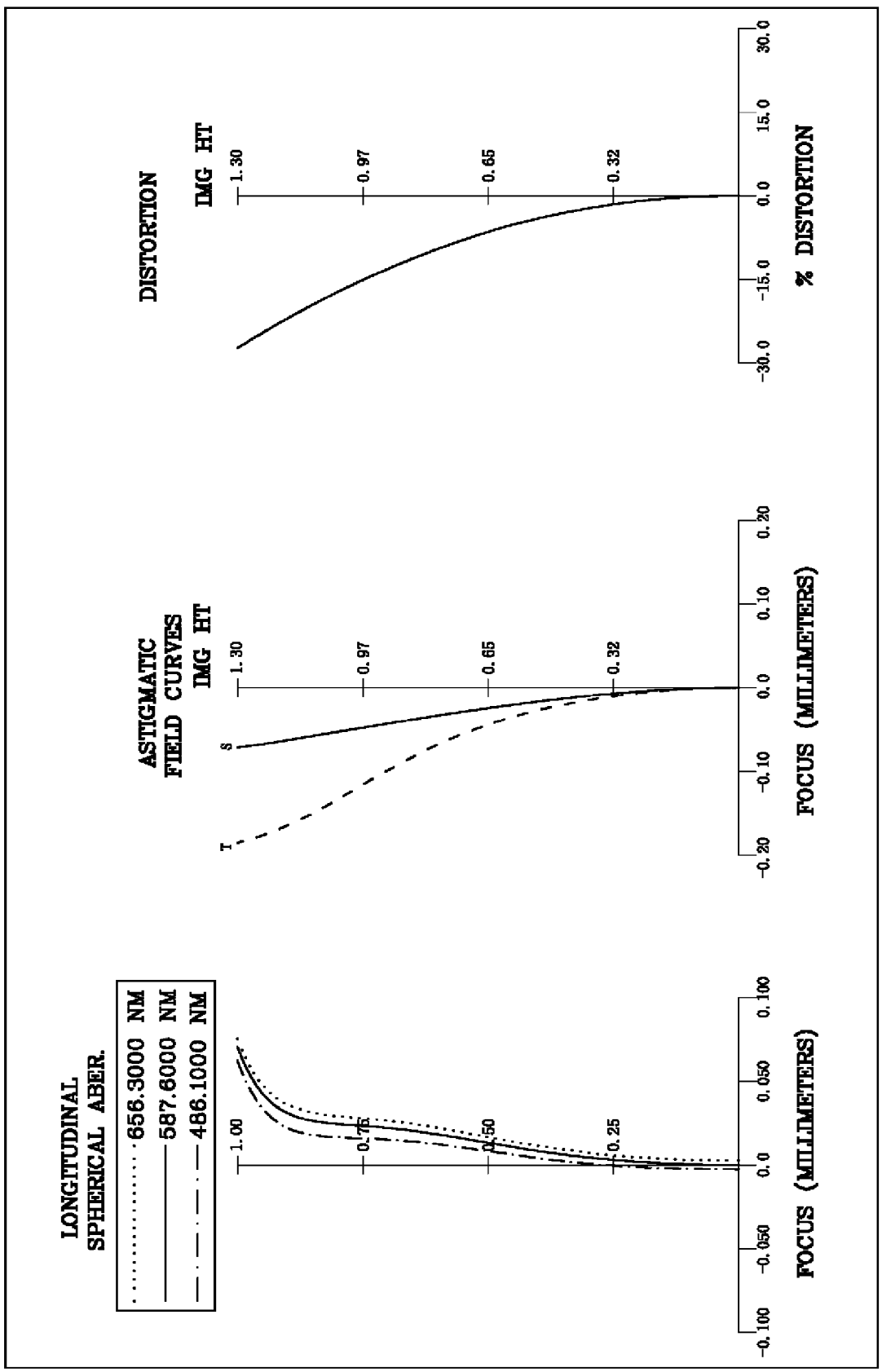
FIG. 3B shows the longitudinal spherical aberration curves, the astigmatic field curves, and the distortion curve of the third embodiment of the present invention.

Referring to FIG. 3A, which shows an optical lens system with a wide field of view in accordance with a third embodiment of the present invention, and FIG. 3B shows the longitudinal spherical aberration curves, the astigmatic field curves, and the distortion curve of the third embodiment of the present invention. The third embodiment of the present invention comprises, in order from the object side to the image side:

A first lens element 310 with negative refractive power made of glass has a convex object-side surface 311 and a concave image-side surface 312.

A second lens element 320 with positive refractive power made of plastic has a concave object-side surface 321 and a convex image-side surface 322, and the object-side surface 321 and the image-side surface 322 of the second lens element 320 are aspheric.

A third lens element 330 with positive refractive power made of glass has a convex object-side surface 331 and a convex image-side surface 332.

A fourth lens element 340 with negative refractive power made of plastic has a concave object-side surface 341 and a convex image-side surface 342, and the object-side surface 341 and the image-side surface 342 of the fourth lens element 140 are aspheric.

A fifth lens element 350 with positive refractive power made of plastic has a convex object-side surface 351 and a convex image-side surface 352, and the object-side surface 351 and the image-side surface 352 of the fifth lens element 350 are aspheric.

A sixth lens element 360 with negative refractive power made of plastic has a concave object-side surface 361 and a concave image-side surface 362, and the object-side surface 361 and the image-side surface 362 of the fourth lens element 360 are aspheric.

A seventh lens element 370 with positive refractive power made of plastic has a convex object-side surface 371 and a convex image-side surface 372, and the object-side surface 371 and the image-side surface 372 of the seventh lens element 370 are aspheric.

A stop 300 is located between the fifth lens element 350 and the sixth lens element 360.

An IR cut filter 380 made of glass is located between the image-side surface 372 of the seventh lens element 370 and an image plane 390 and has no influence on the focal length of the optical lens system.

A cover glass 381 made of glass is located between the IR cut filter 380 and the image plane 390 to protect a sensor (not shown), and has no influence on the focal length of the optical lens system.

In the third embodiment of the present optical lens system, the focal length of the optical lens system with a wide field of view is f, and it satisfies the relation:

$f=1.05$.

In the third embodiment of the present optical lens system, the f-number of the optical lens system with a wide field of view is Fno, and it satisfies the relation:

$Fno=2.08$.

In the third embodiment of the present optical lens system, half of the maximal field of view is HFOV, and it satisfies the relation:

$HFOV=60.3$.

In the third embodiment of the present optical lens system, the Abbe number of the seventh lens element 370 is V7, the Abbe number of the sixth lens element 360 is V6, and they satisfy the relation:

$|V7-V6|=32.50$.

In the third embodiment of the present optical lens system, the radius of curvature of the object-side surface 321 of the second lens element 320 is R3, the radius of curvature of the image-side surface 322 of the second lens element 320 is R4, and they satisfy the relation:

$R3/R4=0.85$.

In the third embodiment of the present optical lens system, the radius of curvature of the object-side surface 341 of the fourth lens element 340 is R7, the radius of curvature of the image-side surface 342 of the fourth lens element 340 is R8, and they satisfy the relation:

$|(R7+R8)/(R7-R8)|=5.35$.

In the third embodiment of the present optical lens system, the radius of curvature of the object-side surface 361 of the sixth lens element 360 is R11, the radius of curvature of the image-side surface 362 of the sixth lens element 360 is R12, and they satisfy the relation:

$(R11+R12)/(R11-R12)=0.29$.

In the third embodiment of the present optical lens system, the focal length of the optical lens system with a wide field of view is f, the distance on the optical axis between the fourth lens element 340 and the fifth lens element 350 is T45, and they satisfy the relation:

$T45/f=0.11$.

In the third embodiment of the present optical lens system, the focal length of the optical lens system with a wide field of view is f, the focal length of the first lens element 310 is f1, and they satisfy the relation:

$f/f1=-0.23$.

In the third embodiment of the present optical lens system, the focal length of the optical lens system with a wide field of view is f, the focal length of the second lens element 320 is f2, and they satisfy the relation:

$|f/f2|=0.04$.

In the third embodiment of the present optical lens system, the focal length of the optical lens system with a wide field of view is f, the focal length of the fourth lens element 340 is f4, and they satisfy the relation:

$|f/f4|=0.05$.

In the third embodiment of the present optical lens system, the distance between the object-side surface 311 of the first lens element 310 and the object-side surface 331 of the third lens element 330 is Dr1r5, the distance between the object-side surface 311 of the first lens element 310 and the image-side surface 372 of the seventh lens element 370 is Td, and they satisfy the relation:

$Dr1r5/Td=0.67$.

In the third embodiment of the present optical lens system, the distance between the object-side surface 351 of the fifth lens element 350 and the image-side surface 372 of the seventh lens element 370 is Dr9r14, and the distance between the object-side surface 311 of the first lens element 310 and the image-side surface 372 of the seventh lens element 370 is Td, and they satisfy the relation:

$Dr9r14/Td=0.14$.

In the third embodiment of the present optical lens system, the focal length of the optical lens system with a wide field of view is f, the focal length of the first lens element 310 is f1, the focal length of the second lens element 320 is f2, the focal length of the third lens element 330 is f3, the focal length of the fourth lens element 340 is f4, the focal length of the fifth lens element 350 is f5, the focal length of the sixth lens element 360 is f6, the focal length of the seventh lens element 370 is f7, SUM|pow|=|f/f1|+|f/f2|+|f/f3|+|f/f4|+|f/f5|+|f/f6|+|f/f7|, and they satisfy the relation:

SUM|pow|=1.77.

In the third embodiment of the present optical lens system, the focal length of the optical lens system with a wide field of view is f, the focal length of the first lens element 310 is f1, the focal length of the second lens element 320 is f2, the focal length of the third lens element 330 is f3, the focal length of the fourth lens element 340 is f4, the focal length of the fifth lens element 350 is f5, the focal length of the sixth lens element 360 is f6, the focal length of the seventh lens element 370 is f7, P5=|f/f5|, P6=|f/f6|, P7=|f/f7|, SUM|pow|=|f/f1|+|f/f2|+|f/f3|+|f/f4|+|f/f5|+|f/f6|+|f/f7|, and they satisfy the relation:

(P5+P6+P7)/(SUM|pow|)=0.74.

In the third embodiment of the present optical lens system, the distance from the stop 300 to the image plane 390 along the optical axis 391 is SL, the distance from the object-side surface 311 of the first lens element 310 to the image plane 390 along the optical axis 391 is TTL, and they satisfy the relation:

SL/TTL=0.20.

The detailed optical data of the third embodiment is shown in table 5, and the aspheric surface data is shown in table 6, wherein the units of the radius of curvature, the thickness and the focal length are expressed in mm.

TABLE 5

(Embodiment 3)
f(focal length) = 1.05 mm, Fno = 2.08, HFOV (half of field of view) = 60.3 deg.

| Surface # |  | Curvature Radius | Thickness | Material | Index | Abbe # | Focal length |
|---|---|---|---|---|---|---|---|
| 0 | Object | Plano | Infinity |  |  |  |  |
| 1 | Lens 1 | 23.9554 | 0.800 | Glass | 1.804 | 46.5 | −4.54 |
| 2 |  | 3.1191 | 3.076 |  |  |  |  |
| 3 | Lens 2 | −2.50494 (ASP) | 2.339 | Plastic | 1.634 | 23.8 | 24.56 |
| 4 |  | −2.93955 (ASP) | 2.399 |  |  |  |  |
| 5 | Lens 3 | 12.9244 | 1.150 | Glass | 1.517 | 64.2 | 7.86 |
| 6 |  | −5.7404 | 0.110 |  |  |  |  |
| 7 | Lens 4 | −2.88656 (ASP) | 0.962 | Plastic | 1.535 | 56.3 | −22.93 |
| 8 |  | −4.21420 (ASP) | 0.119 |  |  |  |  |
| 9 | Lens 5 | 3.33280 (ASP) | 0.636 | Plastic | 1.535 | 56.3 | 2.32 |
| 10 |  | −1.84624 (ASP) | 0.100 |  |  |  |  |
| 11 | Stop | Plano | 0.100 |  |  |  |  |
| 12 | Lens 6 | −3.73570 (ASP) | 0.448 | Plastic | 1.634 | 23.8 | −2.03 |
| 13 |  | 2.06123 (ASP) | 0.099 |  |  |  |  |
| 14 | Lens 7 | 2.07471 (ASP) | 0.446 | Plastic | 1.535 | 56.3 | 3.01 |
| 15 |  | −6.63370 (ASP) | 0.500 |  |  |  |  |
| 16 | IR-filter | Plano | 0.300 | Glass | 1.517 | 64.2 |  |
| 17 |  | Plano | 0.500 |  |  |  |  |
| 18 | Cover-glass | Plano | 0.400 | Glass | 1.517 | 64.2 |  |
| 19 |  | Plano | 0.393 |  |  |  |  |
| 20 | Image | Plano |  |  |  |  |  |

Note:
reference wavelength is: d-line 587.6 nm, and the diameter of the effective aperture of the surface # 8 is 1.996 mm.

TABLE 6

Aspheric Coefficients

| Surface # | 3 | 4 | 7 | 8 | 9 |
|---|---|---|---|---|---|
| k = | −4.02505E+00 | −3.37773E+00 | −2.03484E−01 | −1.62042E+01 | −2.63862E+01 |
| A4 = | −4.70283E−03 | −5.47274E−03 | −2.16422E−02 | 5.58245E−02 | 2.19908E−01 |
| A6 = | 3.79444E−04 | 3.16412E−04 | 4.68355E−02 | 1.00879E−02 | −1.78916E−01 |
| A8 = | −4.47309E−05 | −1.58171E−05 | −1.62055E−02 | 2.25307E−02 | 1.15994E−01 |
| A10 = | 3.01900E−06 | 5.02587E−07 | 1.76786E−03 | −1.88785E−02 | −1.26046E−01 |

| Surface # | 10 | 12 | 13 | 14 | 15 |
|---|---|---|---|---|---|
| k = | −4.34375E+00 | −4.11699E+01 | −8.96095E+00 | −1.40644E+01 | 2.59327E+01 |
| A4 = | 1.11391E−01 | −9.28528E−02 | −1.75368E−01 | 2.64802E−01 | 4.01764E−01 |
| A6 = | −2.60448E−01 | −5.20602E−02 | −1.81425E−02 | −2.63285E−01 | −2.87011E−02 |
| A8 = | 1.94917E−01 | 7.57643E−01 | 1.30045E+00 | 5.39437E−01 | −3.71912E−02 |
| A10 = | −8.97405E−02 | −7.76902E−01 | −1.35367E+00 | −4.61152E−01 | −9.73450E−02 |

Figure 4A:
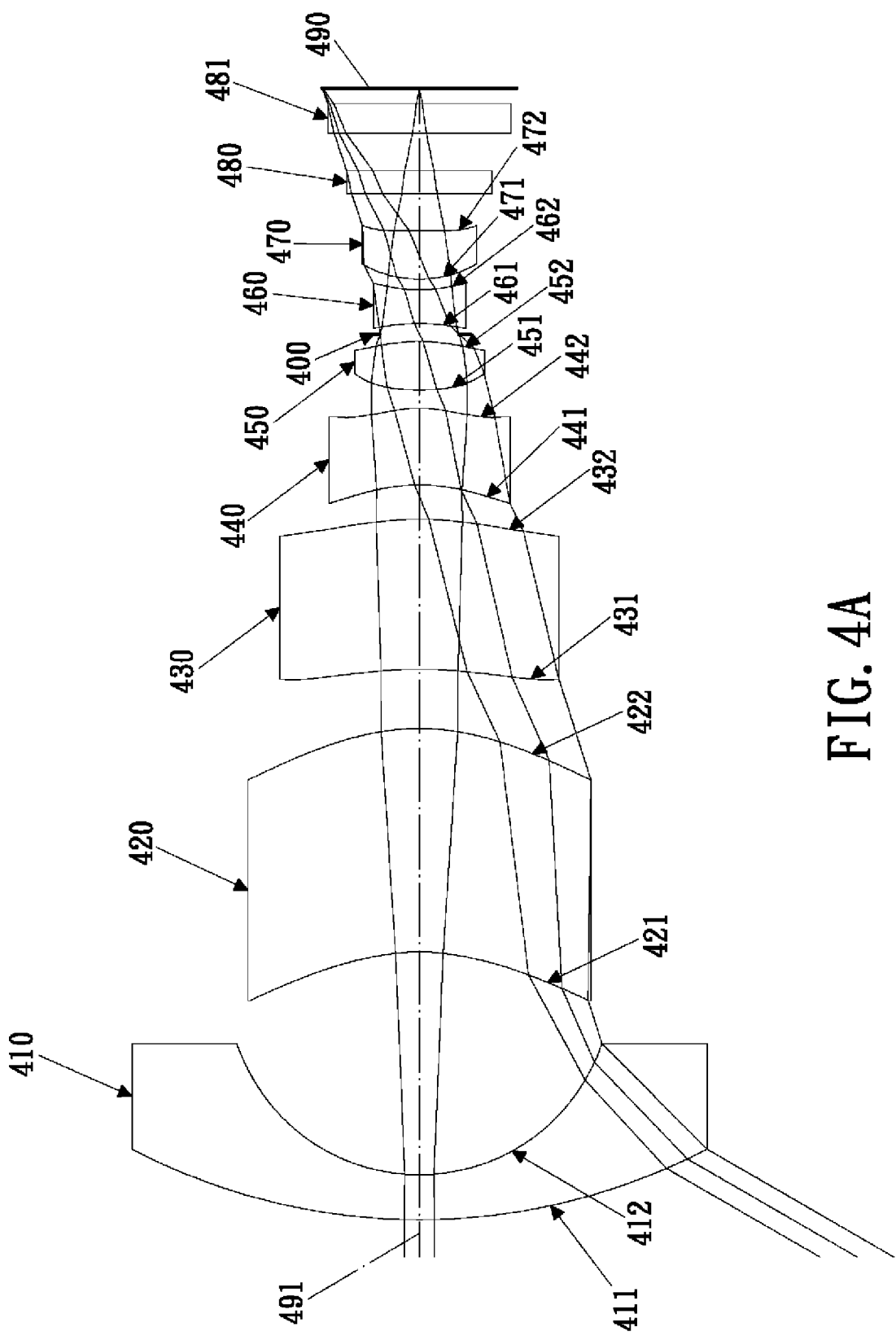
FIG. 4A shows an optical lens system in accordance with a fourth embodiment of the present invention.
Figure 4B:
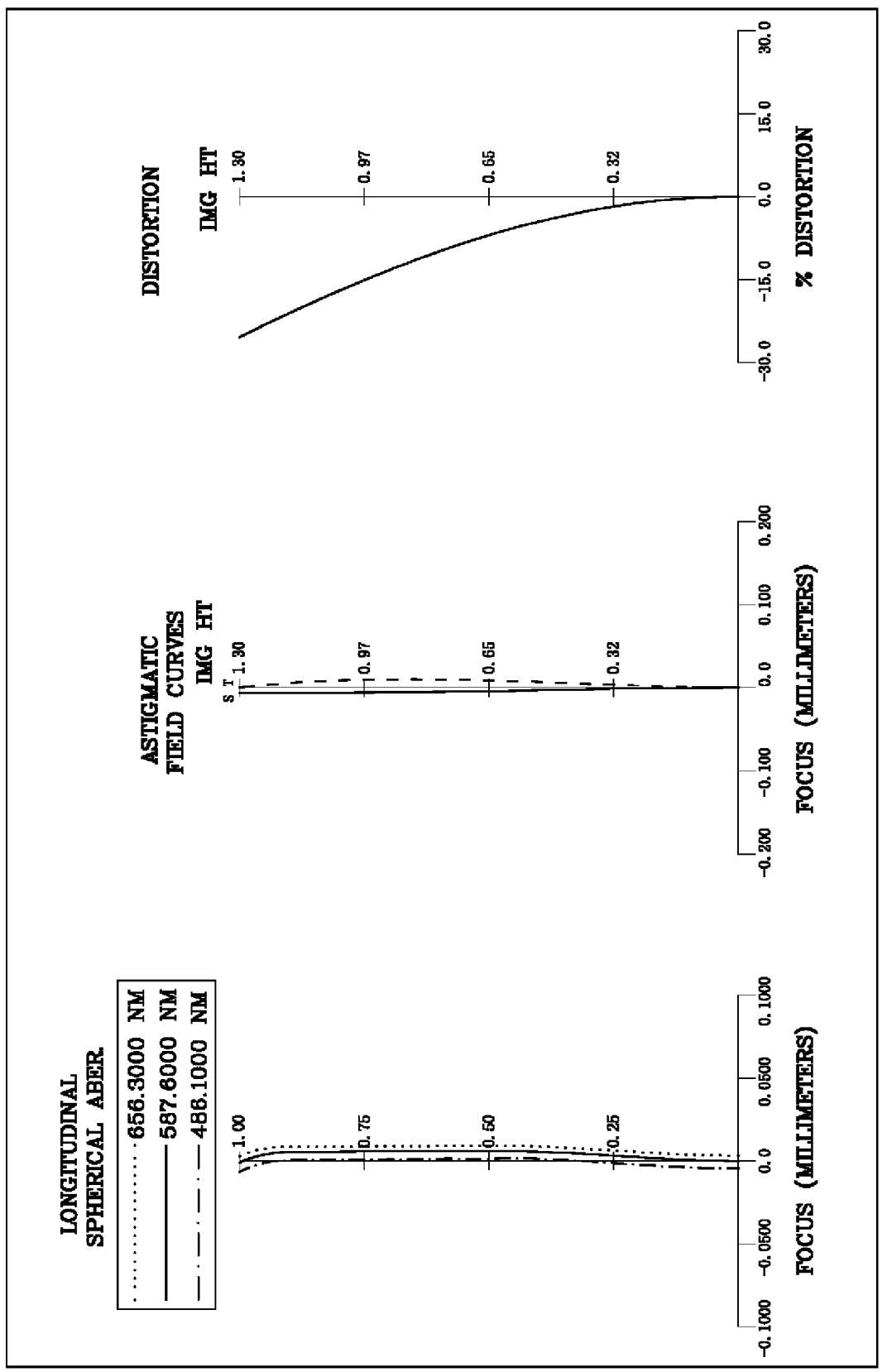
FIG. 4B shows the longitudinal spherical aberration curves, the astigmatic field curves, and the distortion curve of the fourth embodiment of the present invention.

Referring to FIG. 4A, which shows an optical lens system with a wide field of view in accordance with a fourth embodiment of the present invention, and FIG. 4B shows the longitudinal spherical aberration curves, the astigmatic field curves, and the distortion curve of the fourth embodiment of the present invention. The fourth embodiment of the present invention comprises, in order from the object side to the image side:

A first lens element 410 with negative refractive power made of glass has a convex object-side surface 411 and a concave image-side surface 412.

A second lens element 420 with positive refractive power made of plastic has a concave object-side surface 421 and a convex image-side surface 422, and the object-side surface 421 and the image-side surface 422 of the second lens element 420 are aspheric.

A third lens element 430 with positive refractive power made of plastic has a concave object-side surface 431 and a convex image-side surface 432, and the object-side surface 431 and the image-side surface 432 of the third lens element 430 are aspheric.

A fourth lens element 440 with positive refractive power made of plastic has a concave object-side surface 441 and a convex image-side surface 442, and the object-side surface 441 and the image-side surface 442 of the fourth lens element 440 are aspheric.

A fifth lens element 450 with positive refractive power made of plastic has a convex object-side surface 451 and a convex image-side surface 452, and the object-side surface 451 and the image-side surface 452 of the fifth lens element 450 are aspheric.

A sixth lens element 460 with negative refractive power made of plastic has a concave object-side surface 461 and a concave image-side surface 462, and the object-side surface 461 and the image-side surface 462 of the fourth lens element 460 are aspheric.

A seventh lens element 470 with positive refractive power made of plastic has a convex object-side surface 471 and a convex image-side surface 472, and the object-side surface 471 and the image-side surface 472 of the seventh lens element 470 are aspheric.

A stop 400 is located between the fifth lens element 450 and the sixth lens element 460.

An IR cut filter 480 made of glass is located between the image-side surface 472 of the seventh lens element 470 and an image plane 490 and has no influence on the focal length of the optical lens system.

A cover glass 481 made of glass is located between the IR cut filter 480 and the image plane 490 to protect a sensor (not shown), and has no influence on the focal length of the optical lens system.

In the fourth embodiment of the present optical lens system, the focal length of the optical lens system with a wide field of view is f, and it satisfies the relation:

$f=1.03$.

In the fourth embodiment of the present optical lens system, the f-number of the optical lens system with a wide field of view is Fno, and it satisfies the relation:

$Fno=2.50$.

In the fourth embodiment of the present optical lens system, half of the maximal field of view is HFOV, and it satisfies the relation:

$HFOV=60.0$.

In the fourth embodiment of the present optical lens system, the Abbe number of the seventh lens element 470 is V7, the Abbe number of the sixth lens element 160 is V6, and they satisfy the relation:

$|V7-V6|=32.50$.

In the fourth embodiment of the present optical lens system, the radius of curvature of the object-side surface 421 of the second lens element 420 is R3, the radius of curvature of the image-side surface 422 of the second lens element 420 is R4, and they satisfy the relation:

$R3/R4=0.99$.

In the fourth embodiment of the present optical lens system, the radius of curvature of the object-side surface 441 of the fourth lens element 440 is R7, the radius of curvature of the image-side surface 442 of the fourth lens element 440 is R8, and they satisfy the relation:

$|(R7+R8)/(R7-R8)|=6.15$.

In the fourth embodiment of the present optical lens system, the radius of curvature of the object-side surface 461 of the sixth lens element 460 is R11, the radius of curvature of the image-side surface 462 of the sixth lens element 460 is R12, and they satisfy the relation:

$(R11+R12)/(R11-R12)=0.01$.

In the fourth embodiment of the present optical lens system, the focal length of the optical lens system with a wide field of view is f, the distance on the optical axis between the fourth lens element 440 and the fifth lens element 450 is T45, and they satisfy the relation:

$T45/f=0.24$.

In the fourth embodiment of the present optical lens system, the focal length of the optical lens system with a wide field of view is f, the focal length of the first lens element 410 is f1, and they satisfy the relation:

$f/f1=-0.21$.

In the fourth embodiment of the present optical lens system, the focal length of the optical lens system with a wide field of view is f, the focal length of the second lens element 420 is f2, and they satisfy the relation:

$|f/f2|=0.08$.

In the fourth embodiment of the present optical lens system, the focal length of the optical lens system with a wide field of view is f, the focal length of the fourth lens element 440 is f4, and they satisfy the relation:

$|f/f4|=0.12$.

In the fourth embodiment of the present optical lens system, the distance between the object-side surface 411 of the first lens element 410 and the object-side surface 431 of the third lens element 430 is Dr1r5, the distance between the object-side surface 411 of the first lens element 410 and the image-side surface 472 of the seventh lens element 470 is Td, and they satisfy the relation:

$Dr1r5/Td=0.56$.

In the fourth embodiment of the present optical lens system, the distance between the object-side surface 451 of the fifth lens element 450 and the image-side surface 472 of the seventh lens element 470 is Dr9r14, and the distance between the object-side surface 411 of the first lens element 410 and the image-side surface 472 of the seventh lens element 470 is Td, and they satisfy the relation:

$Dr9r14/Td=0.16$.

In the fourth embodiment of the present optical lens system, the focal length of the optical lens system with a wide field of view is f, the focal length of the first lens element 410 is f1, the focal length of the second lens element 420 is f2, the focal length of the third lens element 430 is f3, the focal length of the fourth lens element 440 is f4, the focal length of the fifth lens element 450 is f5, the focal length of the sixth lens element 460 is f6, the focal length of the seventh lens element 470 is f7, SUM|pow|=|f/f1|+|f/f2|+|f/f3|+|f/f4|+|f/f5|+|f/f6|+|f/f7|, and they satisfy the relation:

SUM|pow|=1.76.

In the fourth embodiment of the present optical lens system, the focal length of the optical lens system with a wide field of view is f, the focal length of the first lens element 410 is f1, the focal length of the second lens element 420 is f2, the focal length of the third lens element 430 is f3, the focal length of the fourth lens element 440 is f4, the focal length of the fifth lens element 450 is f5, the focal length of the sixth lens element 460 is f6, the focal length of the seventh lens element 470 is f7, P5=|f/f5|, P6=|f/f6|, P7=|f/f7|, SUM|pow|=|f/f1|+|f/f2|+|f/f3|+|f/f4|+|f/f5|+|f/f6|+|f/f7|, and they satisfy the relation:

$(P5+P6+P7)/(SUM|pow|)=0.75$.

In the fourth embodiment of the present optical lens system, the distance from the stop 400 to the image plane 490 along the optical axis 491 is SL, the distance from the object-side surface 411 of the first lens element 410 to the image plane 490 along the optical axis 491 is TTL, and they satisfy the relation:

$SL/TTL=0.20$.

The detailed optical data of the fourth embodiment is shown in table 7, and the aspheric surface data is shown in table 8, wherein the units of the radius of curvature, the thickness and the focal length are expressed in mm.

TABLE 7

(Embodiment 4)
f(focal length) = 1.03 mm, Fno = 2.50, HFOV (half of field of view) = 60.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 8.2806 | 0.600 | Glass | 1.804 | 46.5 | −4.86 |
| 2 | | 2.5701 | 2.974 | | | | |
| 3 | Lens 2 | −2.99968 (ASP) | 2.985 | Plastic | 1.634 | 23.8 | 12.53 |
| 4 | | −3.01850 (ASP) | 0.790 | | | | |
| 5 | Lens 3 | −5.81640 (ASP) | 2.000 | Plastic | 1.514 | 56.8 | 34.80 |
| 6 | | −4.90040 (ASP) | 0.459 | | | | |
| 7 | Lens 4 | −2.62378 (ASP) | 1.021 | Plastic | 1.535 | 56.3 | 8.52 |
| 8 | | −1.89034 (ASP) | 0.247 | | | | |
| 9 | Lens 5 | 3.50480 (ASP) | 0.648 | Plastic | 1.535 | 56.3 | 2.62 |
| 10 | | −2.18613 (ASP) | 0.100 | | | | |
| 11 | Stop | Plano | 0.141 | | | | |
| 12 | Lens 6 | −2.36134 (ASP) | 0.450 | Plastic | 1.634 | 23.8 | −1.78 |
| 13 | | 2.32679 (ASP) | 0.141 | | | | |
| 14 | Lens 7 | 1.74047 (ASP) | 0.644 | Plastic | 1.535 | 56.3 | 3.04 |
| 15 | | −20.91760 (ASP) | 0.500 | | | | |
| 16 | IR-filter | Plano | 0.300 | Glass | 1.517 | 64.2 | |
| 17 | | Plano | 0.500 | | | | |
| 18 | Cover-glass | Plano | 0.400 | Glass | 1.517 | 64.2 | |
| 19 | | Plano | 0.203 | | | | |
| 20 | Image | Plano | | | | | |

Note:
reference wavelength is d-line 587.6 nm.

TABLE 8

Aspheric Coefficients

| Surface # | 3 | 4 | 5 | 6 | 7 | 8 |
|---|---|---|---|---|---|---|
| k = | −4.37071E+00 | −4.09300E+00 | −6.73818E+00 | −1.22065E+00 | −1.56864E−01 | −8.71891E+00 |
| A4 = | 5.99077E−05 | −3.37026E−03 | 6.27302E−03 | 2.68087E−03 | −2.26904E−02 | 4.34455E−02 |
| A6 = | −3.17286E−04 | 4.53348E−04 | 1.17562E−03 | 3.09539E−03 | 4.67449E−02 | 1.20813E−02 |
| A8 = | 3.05789E−05 | −3.16145E−05 | 5.13661E−05 | −5.08434E−04 | −1.33691E−02 | 2.16894E−02 |
| A10 = | 6.54054E−08 | 3.25519E−06 | 1.96501E−06 | 3.59641E−04 | 1.55924E−03 | −5.99210E−03 |
| A12 = | | | −6.02646E−22 | −6.02646E−22 | | |

| Surface # | 9 | 10 | 12 | 13 | 14 | 15 |
|---|---|---|---|---|---|---|
| k = | −3.08794E+00 | −3.69920E+00 | −2.47796E+01 | 5.75325E+00 | −8.59103E+00 | −2.50993E+01 |
| A4 = | 2.52380E−01 | 1.13614E−01 | −3.34741E−02 | 3.63822E−02 | 2.98136E−01 | 2.18110E−01 |
| A6 = | −1.44331E−01 | −1.66250E−01 | 2.95108E−02 | −3.39804E−01 | −2.56938E−01 | 1.07945E−01 |
| A8 = | 1.42767E−01 | 2.25415E−01 | −3.41542E−01 | 7.14727E−01 | 2.95929E−01 | −1.64111E−01 |
| A10 = | −3.58446E−02 | −1.22418E−01 | 6.52349E−01 | −6.77588E−01 | −1.34025E−01 | 1.38419E−01 |

Figure 5A:
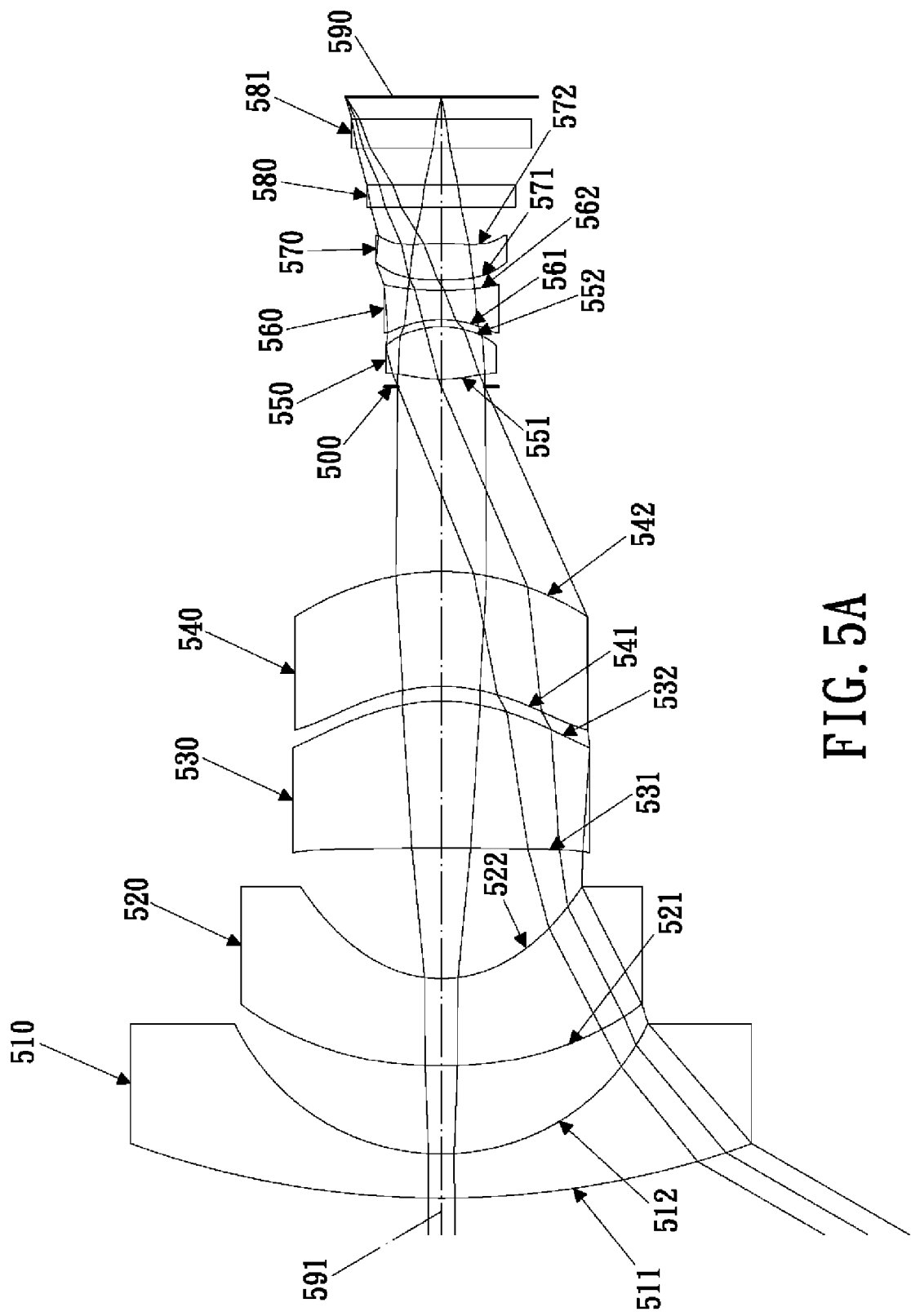
FIG. 5A shows an optical lens system in accordance with a fifth embodiment of the present invention.
Figure 5B:
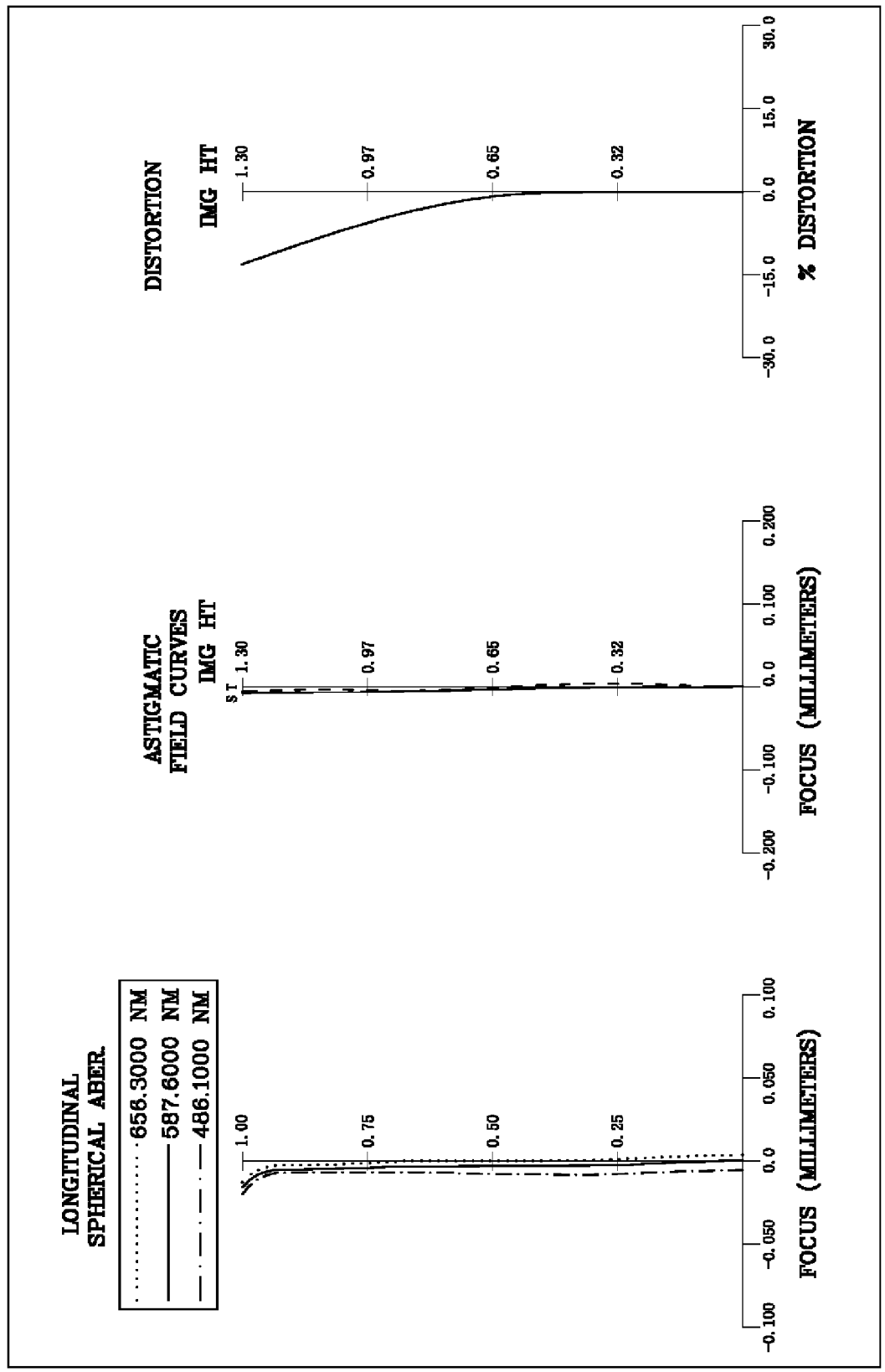
FIG. 5B shows the longitudinal spherical aberration curves, the astigmatic field curves, and the distortion curve of the fifth embodiment of the present invention.

Referring to FIG. 5A, which shows an optical lens system with a wide field of view in accordance with a fifth embodiment of the present invention, and FIG. 5B shows the longitudinal spherical aberration curves, the astigmatic field curves, and the distortion curve of the fifth embodiment of the present invention. The fifth embodiment of the present invention comprises, in order from the object side to the image side:

A first lens element 510 with negative refractive power made of glass has a convex object-side surface 511 and a concave image-side surface 512.

A second lens element 520 with negative refractive power made of plastic has a convex object-side surface 521 and a concave image-side surface 522, and the object-side surface 521 and the image-side surface 522 of the second lens element 520 are aspheric.

A third lens element 530 with positive refractive power made of plastic has a concave object-side surface 531 and a convex image-side surface 532, and the object-side surface 531 and the image-side surface 532 of the third lens element 530 are aspheric.

A fourth lens element 540 with negative refractive power made of plastic has a concave object-side surface 541 and a convex image-side surface 542, and the object-side surface 541 and the image-side surface 542 of the fourth lens element 540 are aspheric.

A fifth lens element 550 with positive refractive power made of plastic has a convex object-side surface 551 and a convex image-side surface 552, and the object-side surface 551 and the image-side surface 552 of the fifth lens element 550 are aspheric.

A sixth lens element 560 with negative refractive power made of plastic has a concave object-side surface 561 and a concave image-side surface 562, and the object-side surface 561 and the image-side surface 562 of the fourth lens element 560 are aspheric.

A seventh lens element 570 with positive refractive power made of plastic has a convex object-side surface 571 and a convex image-side surface 572, and the object-side surface 571 and the image-side surface 572 of the seventh lens element 570 are aspheric.

A stop 500 is located between the fourth lens element 540 and the fifth lens element 550.

An IR cut filter 580 made of glass is located between the image-side surface 572 of the seventh lens element 570 and an image plane 590 and has no influence on the focal length of the optical lens system.

A cover glass 581 made of glass is located between the IR cut filter 580 and the image plane 590 to protect a sensor (not shown), and has no influence on the focal length of the optical lens system.

In the fifth embodiment of the present optical lens system, the focal length of the optical lens system with a wide field of view is f, and it satisfies the relation:

$f=0.89.$

In the fifth embodiment of the present optical lens system, the f-number of the optical lens system with a wide field of view is Fno, and it satisfies the relation:

$Fno=2.40.$

In the fifth embodiment of the present optical lens system, half of the maximal field of view is HFOV, and it satisfies the relation:

$HFOV=59.9.$

In the fifth embodiment of the present optical lens system, the Abbe number of the seventh lens element 570 is V7, the Abbe number of the sixth lens element 160 is V6, and they satisfy the relation:

$|V7-V6|=32.50.$

In the fifth embodiment of the present optical lens system, the radius of curvature of the object-side surface 521 of the second lens element 520 is R3, the radius of curvature of the image-side surface 522 of the second lens element 520 is R4, and they satisfy the relation:

$R3/R4=3.93.$

In the fifth embodiment of the present optical lens system, the radius of curvature of the object-side surface 541 of the fourth lens element 540 is R7, the radius of curvature of the image-side surface 542 of the fourth lens element 540 is R8, and they satisfy the relation:

$|(R7+R8)/(R7-R8)|=7.41.$

In the fifth embodiment of the present optical lens system, the radius of curvature of the object-side surface 561 of the sixth lens element 560 is R11, the radius of curvature of the image-side surface 562 of the sixth lens element 560 is R12, and they satisfy the relation:

$(R11+R12)/(R11-R12)=-0.56.$

In the fifth embodiment of the present optical lens system, the focal length of the optical lens system with a wide field of view is f, the distance on the optical axis between the fourth lens element 540 and the fifth lens element 550 is T45, and they satisfy the relation:

$T45/f=2.94.$

In the fifth embodiment of the present optical lens system, the focal length of the optical lens system with a wide field of view is f, the focal length of the first lens element 510 is f1, and they satisfy the relation:

$f/f1=-0.17.$

In the fifth embodiment of the present optical lens system, the focal length of the optical lens system with a wide field of view is f, the focal length of the second lens element 520 is f2, and they satisfy the relation:

$|f/f2|=0.22.$

In the fifth embodiment of the present optical lens system, the focal length of the optical lens system with a wide field of view is f, the focal length of the fourth lens element 540 is f4, and they satisfy the relation:

$|f/f4|=0.01.$

In the fifth embodiment of the present optical lens system, the distance between the object-side surface 511 of the first lens element 510 and the object-side surface 531 of the third lens element 530 is Dr1r5, the distance between the object-side surface 111 of the first lens element 110 and the image-side surface 572 of the seventh lens element 570 is Td, and they satisfy the relation:

$Dr1r5/Td=0.37.$

In the fifth embodiment of the present optical lens system, the distance between the object-side surface 551 of the fifth lens element 550 and the image-side surface 572 of the seventh lens element 570 is Dr9r14, and the distance between the object-side surface 111 of the first lens element 510 and the image-side surface 572 of the seventh lens element 570 is Td, and they satisfy the relation:

$Dr9r14/Td=0.14$.

In the fifth embodiment of the present optical lens system, the focal length of the optical lens system with a wide field of view is f, the focal length of the first lens element 510 is f1, the focal length of the second lens element 520 is f2, the focal length of the third lens element 530 is f3, the focal length of the fourth lens element 540 is f4, the focal length of the fifth lens element 550 is f5, the focal length of the sixth lens element 560 is f6, the focal length of the seventh lens element 570 is f7, SUM|pow|=|f/f1|+|f/f2|+|f/f3|+|f/f4|+|f/f5|+|f/f6|+|f/f7|, and they satisfy the relation:

SUM|pow|=1.89.

In the fifth embodiment of the present optical lens system, the focal length of the optical lens system with a wide field of view is f, the focal length of the first lens element 510 is f1, the focal length of the second lens element 520 is f2, the focal length of the third lens element 530 is f3, the focal length of the fourth lens element 540 is f4, the focal length of the fifth lens element 550 is f5, the focal length of the sixth lens element 560 is f6, the focal length of the seventh lens element 570 is f7, P5=|f/f5|, P6=|f/f6|, P7=|f/f7|, SUM|pow|=|f/f1|+|f/f2|+|f/f3|+|f/f4|+|f/f5|+|f/f6|+|f/f7|, and they satisfy the relation:

$(P5+P6+P7)/(SUM|pow|)=0.68$.

In the fifth embodiment of the present optical lens system, the distance from the stop 500 to the image plane 590 along the optical axis 591 is SL, the distance from the object-side surface 511 of the first lens element 510 to the image plane 590 along the optical axis 591 is TTL, and they satisfy the relation:

$SL/TTL=0.25$.

The detailed optical data of the fifth embodiment is shown in table 9, and the aspheric surface data is shown in table 10, wherein the units of the radius of curvature, the thickness and the focal length are expressed in mm.

TABLE 9

(Embodiment 5)
f(focal length) = 0.89 mm, Fno = 2.40, HFOV (half of field of view) = 59.9 deg.

| Surface # |  | Curvature Radius | Thickness | Material | Index | Abbe # | Focal length |
|---|---|---|---|---|---|---|---|
| 0 | Object | Plano | Infinity |  |  |  |  |
| 1 | Lens 1 | 12.38 | 0.600 | Glass | 1.804 | 46.5 | −5.32 |
| 2 |  | 3.1111 | 1.206 |  |  |  |  |
| 3 | Lens 2 | 7.09060 (ASP) | 1.185 | Plastic | 1.650 | 21.4 | −4.09 |
| 4 |  | 1.80548 (ASP) | 1.779 |  |  |  |  |
| 5 | Lens 3 | −21.83890 (ASP) | 2.000 | Plastic | 1.632 | 23.4 | 4.39 |
| 6 |  | −2.54743 (ASP) | 0.200 |  |  |  |  |
| 7 | Lens 4 | −2.53957 (ASP) | 1.564 | Plastic | 1.544 | 55.9 | −64.42 |
| 8 |  | −3.33210 (ASP) | 2.521 |  |  |  |  |
| 9 | Stop | Plano | 0.100 |  |  |  |  |
| 10 | Lens 5 | 2.13239 (ASP) | 0.710 | Plastic | 1.544 | 55.9 | 1.61 |
| 11 |  | −1.31589 (ASP) | 0.100 |  |  |  |  |
| 12 | Lens 6 | −1.43108 (ASP) | 0.400 | Plastic | 1.632 | 23.4 | −1.73 |
| 13 |  | 5.09880 (ASP) | 0.140 |  |  |  |  |
| 14 | Lens 7 | 5.16900 (ASP) | 0.495 | Plastic | 1.544 | 55.9 | 4.00 |
| 15 |  | −3.63800 (ASP) | 0.500 |  |  |  |  |
| 16 | IR-filter | Plano | 0.300 | Glass | 1.517 | 64.2 |  |
| 17 |  | Plano | 0.500 |  |  |  |  |
| 18 | Cover-glass | Plano | 0.400 | Glass | 1.517 | 64.2 |  |
| 19 |  | Plano | 0.303 |  |  |  |  |
| 20 | Image | Plano |  |  |  |  |  |

Note:
reference wavelength is: d-line 587.6 nm.

TABLE 10

Aspheric Coefficients

| Surface # | 3 | 4 | 5 | 6 | 7 | 8 |
|---|---|---|---|---|---|---|
| k = | 1.84790E+00 | −4.72228E−01 | 3.63256E+01 | −4.06719E+00 | 3.14946E−02 | 3.57157E−02 |
| A4 = | 1.36527E−02 | 1.54865E−02 | 1.01988E−02 | −9.42704E−03 | 9.91560E−03 | −1.53775E−03 |
| A6 = | −2.36178E−03 | −1.26499E−03 | −7.32888E−05 | 3.06422E−03 | 3.50636E−03 | 2.67240E−03 |
| A8 = | 1.42795E−04 | −2.19906E−03 | −8.83046E−04 | −9.70423E−04 | −3.90101E−04 | −5.64163E−04 |
| A10 = | 1.14455E−06 | 4.02116E−04 | 1.01882E−04 | 1.53891E−04 | 1.04051E−04 | 4.53251E−05 |
| A12 = | −2.38591E−22 | −2.38608E−22 |  |  |  |  |

| Surface # | 10 | 11 | 12 | 13 | 14 | 15 |
|---|---|---|---|---|---|---|
| k = | −2.25149E+00 | −5.93244E−01 | −8.92417E+00 | 1.14290E+01 | −5.00000E+01 | −1.16549E+00 |
| A4 = | −9.21522E−03 | 1.23860E−01 | −2.55268E−01 | −6.26611E−02 | 3.26812E−01 | 3.29132E−01 |
| A6 = | −1.77711E−01 | −4.93134E−01 | 3.13135E−01 | 2.33412E−01 | 8.69100E−03 | 1.30054E−01 |
| A8 = | 2.64277E−01 | 2.54477E−01 | −4.02039E−01 | −2.22027E−02 | −1.08273E−01 | −1.13089E−01 |
| A10 = | −9.95569E−01 | −2.37170E−01 | 2.80532E−01 | −1.44414E−01 | 5.16139E−02 | 3.51237E−02 |

TABLE 11

|  | Embodiment 1 | Embodiment 2 | Embodiment 3 | Embodiment 4 | Embodiment 5 |
|---|---|---|---|---|---|
| f | 1.04 | 0.92 | 1.05 | 1.03 | 0.89 |
| Fno | 2.08 | 2.05 | 2.08 | 2.50 | 2.40 |
| HFOV | 60.4 | 60.3 | 60.3 | 60.0 | 59.9 |
| V7 − V6 | 32.90 | 32.50 | 32.50 | 32.50 | 32.50 |
| R3/R4 | 0.85 | 9.48 | 0.85 | 0.99 | 3.93 |
| |(R7 + R8)/(R7 − R8)| | 5.42 | 8.45 | 5.35 | 6.15 | 7.41 |
| (R11 + R12)/(R11 − R12) | 0.34 | −0.34 | 0.29 | 0.01 | −0.56 |
| T45/f | 0.12 | 2.37 | 0.11 | 0.24 | 2.94 |
| f/f1 | −0.23 | −0.15 | −0.23 | −0.21 | −0.17 |
| |f/f2| | 0.04 | 0.21 | 0.04 | 0.08 | 0.22 |
| |f/f4| | 0.04 | 0.06 | 0.05 | 0.12 | 0.01 |
| Dr1r5/Td | 0.68 | 0.35 | 0.67 | 0.56 | 0.37 |
| Dr9r14/Td | 0.14 | 0.15 | 0.14 | 0.16 | 0.14 |
| SUM|pow| | 1.73 | 1.65 | 1.77 | 1.76 | 1.89 |
| (P5 + P6 + P7)/(SUM|pow|) | 0.74 | 0.69 | 0.74 | 0.75 | 0.68 |
| SL/TTL | 0.20 | 0.26 | 0.20 | 0.20 | 0.25 |

It is to be noted that the tables 1-10 show different data from the different embodiments, however, the data of the different embodiments is obtained from experiments. Therefore, any product of the same structure is deemed to be within the scope of the present invention even if it uses different data. Table 11 lists the relevant data for the various embodiments of the present invention.

While we have shown and described various embodiments in accordance with the present invention, it should be clear to those skilled in the art that further embodiments may be made without departing from the scope of the present invention.

What is claimed is:

1. An optical lens system with a wide field of view comprising, in order from an object side to an image side:
    a first lens element with negative refractive power having a convex object-side surface and a concave image-side surface;
    a second lens element;
    a third lens element;
    a fourth lens element having a concave object-side surface and a convex image-side surface;
    a fifth lens element with positive refractive power;
    a sixth lens element with negative refractive power;
    a seventh lens element, at least one of an object-side and an image-side surfaces of the seventh lens element being aspheric;
    wherein there are seven lens elements with refractive power and a stop in the optical lens system; wherein a radius of curvature of an object-side surface of the sixth lens element is R11, a radius of curvature of an image-side surface of the sixth lens element is R12, a focal length of the optical lens system with a wide field of view is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a sum of absolute value of the refractive power is SUM|pow| (SUM|pow|=|f/f1|+|f/f2|+|f/f3|+|f/f4|+|f/f5|+|f/f6|+|f/f7|), a distance from the stop to an image plane along an optical axis is SL, a distance from the object-side surface of the first lens element to the image plane along the optical axis is TTL, and they satisfy the relations:

$$-0.7<(R11+R12)/(R11-R12)<0.7;$$

$$SUM|pow|<2.5;$$

$$0.15<SL/TTL<0.40.$$

2. The optical lens system with a wide field of view as claimed in claim 1, wherein an object-side surface and an image-side surface of the sixth lens element are aspheric, the seventh lens element is made of plastic, and the object-side surface and the image-side surface of the seventh lens element are aspheric.

3. The optical lens system with a wide field of view as claimed in claim 2, wherein the focal length of the optical lens system with a wide field of view is f, the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, the focal length of the seventh lens element is f7, an absolute value of the refractive power of the fifth lens element is P5 (P5=|f/f5|), an absolute value of the refractive power of the sixth lens element is P6 (P6=|f/f6|), an absolute value of the refractive power of the seventh lens element is P7 (P7=|f/f7|), the sum of absolute value of the refractive power is SUM|pow|(SUM|pow|=|f/f1|+|f/f2|+|f/f3|+|f/f4|+|f/f5|+|f/f6|+|f/f7|), and they satisfy the relation:

$$0.5<(P5+P6+P7)/(SUM|pow|)<1.0.$$

4. The optical lens system with a wide field of view as claimed in claim 3, wherein an object-side surface and an image-side surface of the fifth lens element are convex, the object-side surface and the image-side surface of the sixth lens element are concave, and at least one inflection point is formed on the seventh lens element.

5. The optical lens system with a wide field of view as claimed in claim 4, wherein the first lens element is made of glass, a refractive index of the first lens element is N1, and it satisfies the relation:

$$N1>1.70.$$

6. The optical lens system with a wide field of view as claimed in claim 5, wherein the second lens element has a convex object-side surface and a concave image-side surface while having negative refractive power.

7. The optical lens system with a wide field of view as claimed in claim 6, wherein the third lens element has a concave object-side surface and a convex image-side surface while having positive refractive power, the focal length of the optical lens system with a wide field of view is f, a distance on the optical axis between the fourth lens element and the fifth lens element is T45, and they satisfy the relation:

$2.0 < T45/f < 3.5.$

8. The optical lens system with a wide field of view as claimed in claim 5, wherein the focal length of the optical lens system with a wide field of view is f, the focal length of the fourth lens element is f4, and they satisfy the relation:

$|f/f4| < 0.2.$

9. The optical lens system with a wide field of view as claimed in claim 8, wherein the focal length of the optical lens system with a wide field of view is f, the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, the focal length of the seventh lens element is f7, the sum of absolute value of the refractive power is SUM|pow|(SUM|pow|=|f/f1|+|f/f2|+|f/f3|+|f/f4|+|f/f5|+|f/f6|+|f/f7|), and it satisfies the relation:

$SUM|pow| < 2.0.$

10. The optical lens system with a wide field of view as claimed in claim 4, wherein a distance between the object-side surface of the fifth lens element and the image-side surface of the seventh lens element is Dr9r14, a distance between the object-side surface of the first lens element and the image-side surface of the seventh lens element is Td, and they satisfy the relation:

$0.07 < Dr9r14/Td < 0.25.$

11. The optical lens system with a wide field of view as claimed in claim 10, wherein the distance between the object-side surface of the fifth lens element and the image-side surface of the seventh lens element is Dr9r14, the distance between the object-side surface of the first lens element and the image-side surface of the seventh lens element is Td, and they satisfy the relation:

$0.12 < Dr9r14/Td < 0.18.$

12. The optical lens system with a wide field of view as claimed in claim 11, wherein an Abbe number of the sixth lens element is V6, an Abbe number of the seventh lens element is V7, and they satisfy the relation:

$28.0 < V7-V6 < 40.0.$

13. The optical lens system with a wide field of view as claimed in claim 10, wherein the focal length of the optical lens system with a wide field of view is f, the focal length of the fourth lens element is f4, and they satisfy the relation:

$|f/f4| < 0.1.$

14. The optical lens system with a wide field of view as claimed in claim 10, wherein a distance between an object-side surface of the first lens element and the object-side surface of the third lens element is Dr1r5, the distance between the object-side surface of the first lens element and the image-side surface of the seventh lens element is Td, and they satisfy the relation:

$0.5 < Dr1r5/Td < 0.8.$

15. The optical lens system with a wide field of view as claimed in claim 10, wherein the focal length of the optical lens system with a wide field of view is f, the focal length of the first lens element is f1, and they satisfy the relation:

$-0.3 < f/f1 < -0.1.$

16. An optical lens system with a wide field of view comprising, in order from an object side to an image side:
   a first lens element with negative refractive power having a convex object-side surface and a concave image-side surface;
   a second lens element;
   a third lens element having a convex image-side surface;
   a fourth lens element;
   a fifth lens element with positive refractive power having a convex object-side surface and a convex image-side surface;
   a sixth lens element with negative refractive power having a concave object-side surface and a concave image-side surface;
   a seventh lens element with positive refractive power having a convex object-side surface, at least one inflection point formed on the seventh lens element;
   wherein there are seven lens elements with refractive power; wherein a focal length of the optical lens system with a wide field of view is f, a focal length of the fourth lens element is f4, a distance between the object-side surface of the fifth lens element and an image-side surface of the seventh lens element is Dr9r14, a distance between the object-side surface of the first lens element and the image-side surface of the seventh lens element is Td, and they satisfy the relations:

$|f/f4| < 0.2;$ $0.07 < Dr9r14/Td < 0.25.$

17. The optical lens system with a wide field of view as claimed in claim 16, wherein the fifth lens element, the sixth lens element and the seventh lens element are made of plastic.

18. The optical lens system with a wide field of view as claimed in claim 17, wherein the fourth lens element has a concave object-side surface and a convex image-side surface, a radius of curvature of the object-side surface of the fourth lens element is R7, a radius of curvature of the image-side surface of the fourth lens element is R8, and they satisfy the relation:

$4.5 < |(R7+R8)/(R7-R8)| < 9.0.$

19. The optical lens system with a wide field of view as claimed in claim 18, wherein a distance between the object-side surface of the first lens element and an object-side surface of the third lens element is Dr1r5, a distance between the object-side surface of the first lens element and the image-side surface of the seventh lens element is Td, and they satisfy the relation:

$0.5 < Dr1r5/Td < 0.8.$

20. The optical lens system with a wide field of view as claimed in claim 18, wherein the focal length of the optical lens system with a wide field of view is f, a focal length of the first lens element is f1, and they satisfy the relation:

$-0.3 < f/f1 < -0.1.$

21. The optical lens system with a wide field of view as claimed in claim 18, wherein the first lens element is made of glass, an Abbe number of the sixth lens element is V6, an Abbe number of the seventh lens element is V7, and they satisfy the relation:

$$28.0 < V7-V6 < 40.0.$$

22. The optical lens system with a wide field of view as claimed in claim 21, wherein a radius of curvature of the object-side surface of the sixth lens element is R11, a radius of curvature of the image-side surface of the sixth lens element is R12, and they satisfy the relation:

$$-0.7 < (R11+R12)/(R11-R12) < 0.7.$$

23. The optical lens system with a wide field of view as claimed in claim 18, wherein the focal length of the optical lens system with a wide field of view is f, a focal length of the first lens element is f1, a focal length of the second lens element is f2, a focal length of the third lens element is f3, the focal length of the fourth lens element is f4, a focal length of the fifth lens element is f5, a focal length of the sixth lens element is f6, a focal length of the seventh lens element is f7, an absolute value of the refractive power of the fifth lens element is P5 (P5=|f/f5|), an absolute value of the refractive power of the sixth lens element is P6 (P6=|f/f6|), an absolute value of the refractive power of the seventh lens element is P7 (P7=|f/f7|), a sum of absolute values of the refractive power is SUM|pow|(SUM|pow|=|f/f1|+|f/f2|+|f/f3|+|f/f4|+|f/f5|+|f/f6|+|f/f7|), and they satisfy the relation:

$$0.5 < (P5+P6+P7)/(SUM|pow|) < 1.0.$$

24. The optical lens system with a wide field of view as claimed in claim 23, wherein the absolute value of the refractive power of the fifth lens element is P5 (P5=|f/f5|), the absolute value of the refractive power of the sixth lens element is P6 (P6=|f/f6|), the absolute value of the refractive power of the seventh lens element is P7 (P7=|f/f7|), the sum of absolute values of the refractive power is SUM|pow| (SUM|pow|=|f/f1|+|f/f2|+|f/f3|+|f/f4|+|f/f5|+|f/f6|+|f/f7|), and they satisfy the relation:

$$0.65 < (P5+P6+P7)/(SUM|pow|) < 0.80.$$

25. The optical lens system with a wide field of view as claimed in claim 18, wherein the distance between the object-side surface of the fifth lens element and the image-side surface of the seventh lens element is Dr9r14, the distance between the object-side surface of the first lens element and the image-side surface of the seventh lens element is Td, and they satisfy the relation:

$$0.12 < Dr9r14/Td < 0.18.$$

* * * * *